United States Patent [19]

Babkin

[11] Patent Number: 5,642,438
[45] Date of Patent: Jun. 24, 1997

[54] METHOD FOR IMAGE COMPRESSION IMPLEMENTING FAST TWO-DIMENSIONAL DISCRETE COSINE TRANSFORM

[75] Inventor: Vladimir Babkin, Saratoga, Calif.

[73] Assignees: Alaris, Inc., Fremont; G.T. Technology, Inc., Saratoga, both of Calif.

[21] Appl. No.: 405,901

[22] Filed: Mar. 17, 1995

Related U.S. Application Data

[62] Division of Ser. No. 176,884, Jan. 3, 1994, Pat. No. 5,539,836, which is a continuation of Ser. No. 811,691, Dec. 20, 1991, abandoned.

[51] Int. Cl.$^6$ ........................................... G06K 9/36
[52] U.S. Cl. .......................... 382/250; 358/433; 364/725
[58] Field of Search .......................... 382/250; 364/725; 348/405

[56] References Cited

U.S. PATENT DOCUMENTS

| | | | |
|---|---|---|---|
| 4,449,194 | 5/1984 | Wilhelm | 364/725 |
| 4,831,574 | 5/1989 | Duhamel | 364/725 |
| 4,837,724 | 6/1989 | Borgers et al. | 364/725 |
| 5,029,122 | 7/1991 | Uetani | 364/725 |
| 5,181,183 | 1/1993 | Miyazaki | 364/725 |
| 5,231,484 | 7/1993 | Gonzales et al. | 358/133 |
| 5,319,724 | 6/1994 | Blonstein et al. | 382/248 |
| 5,325,126 | 6/1994 | Keith | 348/418 |
| 5,325,215 | 6/1994 | Shibata et al. | 358/479 |
| 5,331,585 | 7/1994 | Tanaka et al. | 364/725 |
| 5,367,331 | 11/1994 | Secher et al. | 348/14 |
| 5,367,629 | 11/1994 | Chu et al. | 395/162 |
| 5,392,072 | 2/1995 | Rodriguez et al. | 348/405 |
| 5,473,379 | 12/1995 | Horne | 348/416 |
| 5,477,272 | 12/1995 | Zhang et al. | 348/407 |
| 5,528,528 | 6/1996 | Bui | 364/725 |

OTHER PUBLICATIONS

Gregory K. Wallace, The JPEG Still Picture Compression Standard, vol. 34, No. 4, pp. 31–45 (Apr. 1991).

*Primary Examiner*—Joseph Mancuso
*Assistant Examiner*—Jayanti K. Patel
*Attorney, Agent, or Firm*—Blakely, Sokoloff, Taylor & Zafman, LLP

[57] ABSTRACT

A method and apparatus for the realization of two-dimensional discrete cosine transform (DCT) for an 8*8 image fragment with three levels of approximation of DCT coefficients. A first embodiment uses two multiplications for a pixel. A second embodiment does not use multiplications. The accuracy of approximation of DCT coefficients in the second embodiment is coordinated with distortion defined by a given quantization matrix. The Discrete Algebraic Transform (DAT) is presented. The DAT is a good approximation of the DCT and can be used in any combination with DCT.

19 Claims, 12 Drawing Sheets

| 1/8 | ν√2/8 | δ√2/8 | ν√2/8 | 1/8 | ν√2/8 | δ√2/8 | ν√2/8 |
|---|---|---|---|---|---|---|---|
| ν√2/8 | ν²/4 | νδ/4 | ν²/4 | ν√2/8 | ν²/4 | νδ/4 | ν²/4 |
| δ√2/8 | νδ/4 | δ²/4 | νδ/4 | δ√2/8 | νδ/4 | δ²/4 | νδ/4 |
| ν√2/8 | ν²/4 | νδ/4 | ν²/4 | δ√2/8 | ν²/4 | νδ/4 | ν²/4 |
| 1/8 | ν√2/8 | δ√2/8 | ν√2/8 | 1/8 | ν√2/8 | δ√2/8 | ν√2/8 |
| ν√2/8 | ν²/4 | νδ/4 | ν²/4 | ν√2/8 | ν²/4 | νδ/4 | ν²/4 |
| δ√2/8 | νδ/4 | δ²/4 | νδ/4 | δ√2/8 | νδ/4 | δ²/4 | νδ/4 |
| ν√2/8 | ν²/4 | νδ/4 | ν²/4 | ν√2/8 | ν²/4 | νδ/4 | ν²/4 |

FIG. 2

LUMINANCE QUANTIZATION TABLE

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  |

CHROMINANCE QUANTIZATION TABLE

| 17 | 18 | 24 | 47 | 99 | 99 | 99 | 99 |
|----|----|----|----|----|----|----|----|
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

FIG. 3

METHOD FOR IMAGE COMPRESSION IMPLEMENTING FAST TWO-DIMENSIONAL DISCRETE COSINE TRANSFORM

This is a divisional of application Ser. No. 08/176,884, filed Jan. 3, 1994, U.S. Pat. No. 5,539,836 which is a continuation of application Ser. No. 07/811,691, filed Dec. 20, 1991 abandoned.

FIELD OF THE INVENTION

The invention relates generally to image processing and more particularly to a method and apparatus for compression of still gray scale and color images in accordance with Joint Photographic Experts Group (JPEG, a group of engineers and scientists worldwide that are developing standard methods for the compression and decompression of still-frame, continuous-tone, and photographic images) standard which is described in the JPEG Technical Specification, Revision 8, August 1990. More particularly, the invention relates to means for implementing a two-dimensional Discrete Cosine Transform (DCT) with controllable precision.

DESCRIPTION OF THE PRIOR ART

As electronic communication has advanced over the years, there has been an ever-increasing volume of information both to store and transmit. In view of the volume of information being generated today, the anticipated explosive growth in information in the future, and the physical constraints imposed by storage media and the limitations of the broadcast spectrum, there has been considerable effort devoted to finding ways to conserve storage space and spectrum bandwidth by means of compressing data, to be stored and transmitted. Evidence of this effort can be seen in the number of groups developing compression standards. For example, in addition to the compression standards developed by JPEG, the CCITT has formulated Recommendation H.261 for video teleconferencing and the Moving Pictures Experts Group (MPEG) has proposed a standard for full-motion compression on digital storage media. A number of commercially available image compression products, such as the STI140 JPEG codec from SGS-Thomson, the CL550 by-C-Cube Microsystems Inc. and the L64735 DCT processor from LSI Logic Corp., also show the increasing interest in image compression technology.

Image data in particular, is bandwidth- and storage-intensive. Fortunately, the amount of bandwidth required to transmit an image (or the amount of space needed to store one) can be reduced by removing redundant data which is not required to recreate the stored or transmitted image. Often only the information necessary to recreate an image which is imperceptibly different from the original image, or reasonably so, need be stored or transmitted. Compression techniques which reproduce image data which are not identical to the original are called lossy algorithms. Lossless algorithms do exist, however, the compression ratio achievable with them is much less than with lossy algorithms.

A human observer of an image is less sensitive to the higher frequency components of an image than to the lower frequency components. This characteristic of the human vision system permits a visually satisfactory image to be created from image data wherein the higher frequency components have been removed, or only crudely retained, so as to in effect gain bandwidth or storage space.

In the field of image compression, lossy algorithms exploit the characteristics of the human vision system mentioned above. In particular, the eye is more receptive to detail in the luminance signal than in the chrominance signal. Because of this, luminance signals are usually sampled at higher rates than chrominance signals. Additionally the human eye appears to be less sensitive to energy with a high spatial frequency. An often discussed example of this is the appearance of a video screen with an alternating pattern of black and white pixels as an all gray image. By coding higher frequency coefficients with fewer bits than low frequency coefficients, valuable storage space and spectrum bandwidth can be saved.

The JPEG standard for image compression is based on transform image coding. Transform coding maps the image from one domain into another domain. The JPEG standard uses the discrete cosine transform to map space data into spatial frequency domain data. More particularly, an 8*8 block of pixels, (also called a fragment herein) are transformed by a two-dimensional Discrete Cosine Transform into an 8 by 8 array of components. The values of these components characterize the energy contained in each of 64 different frequencies of the original image data. These components are quantized. Because the eye is less sensitive to the high frequencies, the high frequency components can be represented by fewer bits than the lower frequency components without significantly sacrificing image quality. Put differently, by taking a block of pixels from an image and transforming them into the spatial frequency domain, it becomes possible to perform a quantization wherein the higher frequency components are quantized with larger step than the lower frequency components. In this way bandwidth and/or storage requirements can be minimized. Compression is mainly accomplished at this stage of the JPEG standard through quantization, not through the transform by itself.

A two-dimensional Discrete Cosine Transform (DCT), (or Forward Discrete Cosine Transform (FDCT)), of an 8*8 fragment, which is described by brightnesses (or its functions in case of color pictures) $f(i,j)$, where $i=0,2,\ldots,7$; and $j=0,2,\ldots,7$, is defined as values $F(u,v)$ which can be considered as values corresponding to the frequencies in the transform domain. The JPEG Technical Specification relations for an FDCT are given as follows:

$$F(u,v) = 1/4\ C(u)C(v) \sum_{i=0}^{7} \sum_{j=0}^{7} f(i,j) \cos((2i+1)up) \cos((2j+1)vp) \quad \text{Eq. (1)}$$

where $p=\pi/16$, $C(x)=1/\sqrt{2}$ for $x=0$, and $C(x)=1$ for $x\neq 0$.

It follows from Eq. 1 that the DCT is a separable transform, i.e. a two-dimensional transform can be realized in two steps using the same operations first on columns and then on rows (or vice versa). Operating first on columns a one-dimensional FDCT can be written as:

$$F(k) = C(k)/2 \sum_{i=0}^{7} f(i) \cos((2i+1)kp) \quad \text{Eq. (2)}$$

$$(k = 0, \ldots, 7)$$

Several useful notations, collectively referred to as Eq. set (3), are set forth below:

$\alpha=\cos 4p=\cos(\pi/4)=0.7071067$ $\beta=\cos 2p=\cos(\pi/8)=0.9238795$ $\delta=\cos 6p=\sin(\pi/8)=0.3826834$ $\lambda=\cos p=\cos(\pi/16)=0.9807852$ $\mu = \cos 5p = \sin(3\pi/16) = 0.5555702$ $\nu = \cos 7p = \sin(\pi/16) = 0.1950903$ $\gamma = \cos 3p = \cos(3\pi/16) = 0.8314695$ Eq. set (3)

In the following discussion and description of the invention, Eq. set (3) will be used in the form shown in Eq. set (4) set forth below:

Equation Set (4)

$$F(0) = \alpha/2 \left( \sum_{i=0}^{7} f(i) \right)$$

$$F(1) = (\nu/2) \{ (\lambda/\nu)[f(0) - f(7)] + (\mu/\nu)[f(2) - f(5)] + [f(3) - f(4)] + (\gamma/\nu)[f(1) - f(6)] \}$$

$$F(2) = (\delta/2) \{ (\beta/\delta) [f(0) + f(7) - f(3) - f(4)] - [f(2) + f(5) - f(1) - f(6)] \}$$

$$F(3) = \nu/2 \{ (\gamma/\nu) [f(0) - f(7)] - 1/\nu [f(2) - f(5)] - (\mu/\nu) [f(3) - f(4)] - [f(1) - f(6)] \}$$

$$F(4) = (\alpha/2) \{ [f(0) + f(7) + f(3) + f(4)] - [f(2) + f(5) + f(1) + f(6)] \}$$

$$F(5) = (\nu/2) \{ (\mu/\nu) [f(0) - f(7)] + f(2) - f(5)] + (\gamma/\nu) [f(3) - f(4)] - (\lambda/\nu) [f(1) - f(6)] \}$$

$$\hat{F}(u,v) = C(u,v) Q(u,v).$$

Naturally, since the quantization is not reversible, $\hat{F}(u, v)$ differs from the original values of $F(u, v)$.

There are several schemes for DCT computations. The best known are described in W. H. Chen, C. H. Smith, and S. C. Fralick, A Fast Computational Algorithm for Discrete Cosine Transform, IEEE Transactions on Communications, vol. COM-25, No.9, September 1977, pp. 1004–1009 (see vol. COM-31, No.1, January 1983, pp. 121–123 for corrections), and in Byeong Gi Lee, A New Algorithm to Compute the Discrete Cosine Transform, IEEE Transactions on Acoustics, Speech, and Signal Processing, vol. ASSP-32, No. 6, December 1984, pp. 1243–1245.

In these schemes the two-dimensional transform proceeds as a sequence of two one-dimensional transforms.

The schemes of Chen et al. and Lee, both try to minimize the number of operations required for DCT implementation. These schemes provide an accurate computation of the transform components and introduce an inaccuracy only at the quantization step.

The above-mentioned schemes belong to the class of fast transforms and have different characteristics of complexity which are usually expressed in the number of additions, multiplications and the number of operations levels, i.e. the number of steps necessary to obtain the final result. From this point of view, these schemes have different complexity characteristics. A transform scheme which is most economical by one measure, such as multiplications, is not necessarily the fastest $$F(6) = (\delta/2) \{ [f(0) + f(7) - f(3) - f(4)] + (\beta/\delta) [f(2) + f(5) - f(1) - f(6)] \}$$

$$F(7) = (\nu/2) \{ [f(0) - f(7)] + (\gamma/\nu) [f(2) - f(5)] - (\lambda/\nu) [f(3) - f(4)] - (\mu/\nu) [f(1) - f(6)] \}$$

In line with the principle of image compression the transform components in the frequency domain $F(u,v)$ should be quantized. Essentially an effect of compression is achieved in the process of quantization. Components corresponding to high frequencies are quantized with a larger step than components corresponding to low frequencies. In some situations high frequency components are not transmitted at all. Components corresponding to low frequencies are quantized with a higher precision.

The JPEG standard suggests quantization with a uniform step, but the quantization step is application-specific and is selected individually for every component. In accordance with JPEG mathematical relations, which describe the process of quantization, we have the following form:

For $F(u,v) \leq 0$ $C(u,v) = \lceil F(u,v) + Q(u,v)/2 \rceil / Q(u,v) \rceil$ and for $F(u,v) < 0$ Eq. set (5)

$C(u,v) = \lceil F(u,v) - Q(u,v)/2 \rceil / Q(u,v) \rceil$

Here $Q(u,v)$ is a two-dimensional quantization function in the transform domain, and $\lceil x \rceil$ is the integer part of x.

The procedure of dequantization, i.e. the computation of components of $F(u,v)$ has the following form: because it may be inferior with respect to the depth of computations.

A computational scheme disclosed by Borgers et al. in U.S. Pat. No. 4,837,724 has the advantage of minimal computation depth even though it requires more multiplications than the transform schemes of Chen et al. or Lee.

A method and apparatus for approximate calculation of DCT coefficients is disclosed by Wilhelm in U.S. Pat. No. 4,449,194. This transform scheme does not require multiplications, but rather uses a very inaccurate representation of DCT components. For example, the inaccuracy of the component $\cos 7\pi/16$ as ¼ is equal to 28%.

Accordingly, the transform scheme of Wilhelm cannot use fast transform computations because the representation of DCT components is very inaccurate and the fast transform scheme uses results of computations on the previous steps which can lead to the accumulation of errors. Wilhelm's DCT scheme substantially uses the transform separability. Therefore, the maximal accuracy of an approximation of coefficients of two-dimensional as a result of two-step procedure increases to 64%. Direct Calculations show that the complexity of this scheme is high. A transform of 8 pixels requires one multiplication and 88 additions.

SUMMARY OF THE PRESENT INVENTION

It is therefore an object of the present invention to provide a method and system for computation of a two-dimensional DCT by an approximation of relative values of DCT coefficients as integer algebraic numbers in such a way that components of non-normalized DCT can be computed without multiplications.

It is a further object of the present invention to provide a way to increase an accuracy of an approximation of DCT coefficients using adjusting terms which allows an increase in accuracy with an additional four additions for eight transformed pixels.

It is a further object of the present invention to present the auxiliary results of the first step one-dimensional transform in two-component form with a rational and an algebraic part and realize the second step of one-dimensional transform separately for each of these components.

It is a further object to use approximate values of DCT coefficients as coefficients of a Discrete Algebraic Transform.

It is a further object of the present invention to coordinate the accuracy of the DCT components with the quantization process.

Briefly, the present invention realizes a FDCT by the method of performing a one-dimensional transform on columns and rows, using coefficients of FDCT represented in an approximate two-component form in such a way that the accuracy of this approximation may be chosen beforehand or coordinated with the quantization matrix performing a one dimensional transform on rows for each of these components separately. A novel Discrete Algebraic Transform (DAT) is used to achieve this controllable accuracy approximation. The DAT is implemented in hardware such that the mathematics of the DAT define structural relationships between physical elements.

The preferred system embodiment of the present invention includes eight one-dimensional column transform modules, two one-dimensional row transform modules which also generate final results, and six two-component one-dimensional row transform modules which also generate final results. In the preferred embodiments of the present invention, multiplications have used only at the last step before quantization or have not been used at all.

The DAT of the present invention may be considered as an independent new transform which may be used instead of DCT or together with DCT since DAT is compatible with DCT.

An advantage of the present invention is the elimination of multiplication in auxiliary steps of a transform of columns and rows.

A further advantage of the present invention is a reduction in error accumulation.

A further advantage of the present invention is that it provides a selectable and predetermined degree of accuracy in DCT approximation without a substantial impact on the complexity of the transform operation.

A further advantage of the present invention is the ability to coordinate component accuracy with the quantization process.

These and many other objects and advantages of the present invention will no doubt become obvious to those of ordinary skill in the art after having read the following detailed description of the preferred embodiments which are illustrated in the various drawing figures.

IN THE DRAWINGS

FIG. 1 is a diagram showing a computational scheme for computation of non-normalized components of one-dimensional DCT transforms;

FIG. 2. shows a matrix of normalization multipliers;

FIG. 3 shows examples of quantization matrices;

DETAILED DESCRIPTION OF THE PREFERRED EMBODIMENT

Figure 1:
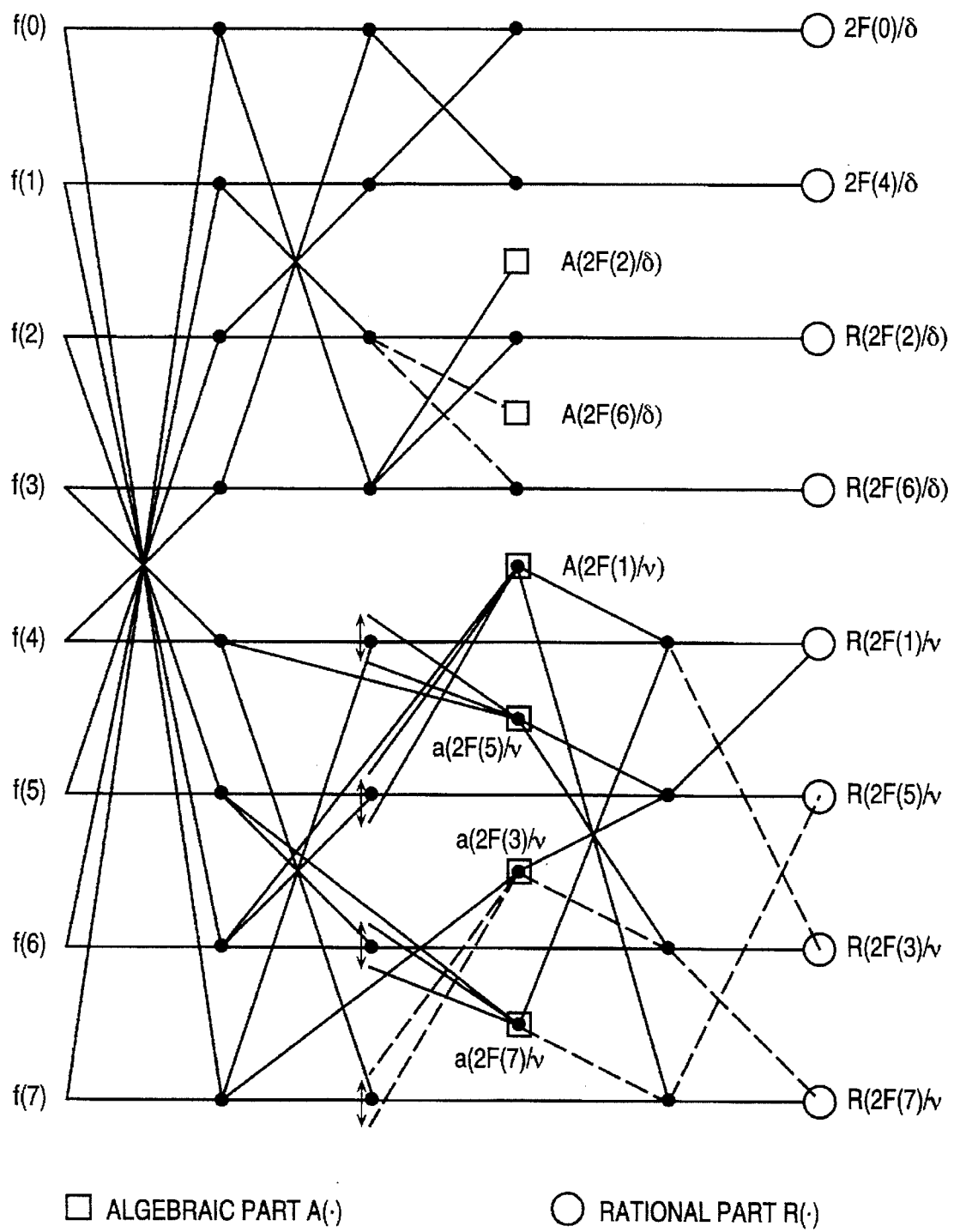

The theory and computational schemes for achieving the JPEG standard DCT results are discussed and a hardware architecture is presented for implementing the JPEG DCT function. The hardware architecture may be realized as a semiconductor integrated circuit.

In the present invention transformed values are generated in four steps. First, a one-dimensional transform is performed on the columns. Second, a one-dimensional transform is performed on the rows. Third, transformed values are obtained, and fourth quantization is performed.

The first two steps are based on one-dimensional transforms of the same type. The final two steps are different for each of two different embodiments which are described more fully herein.

In the two one-dimensional transformations the following representations of non-normalized DCT coefficients have been used:

$$\beta/\delta = 1 + \sqrt{2} = B \quad \text{(precise)} \quad \text{Eq. set (6)}$$
$$\lambda/\nu = 5 + \Delta = L \quad \text{(approximation)}$$
$$\gamma/\nu = (3 + \Delta/2)\sqrt{2} = G \quad \text{(approximation)}$$
$$\mu/\nu = (2 + \Delta/2)\sqrt{2} = M \quad \text{(approximation)}$$

Here $\Delta$ can have the following values $\Delta_0$, $\Delta_1$, and $\Delta_2$.

| | |
|---|---|
| $\Delta_0 = 0$ | zero precision |
| $\Delta_1 = 1/32$ | normal precision Eq. set (7) |
| $\Delta_2 = 1/32 - 1/256$ | double precision |

The relative inaccuracy of a representation of these coefficients is expressed as shown in Table I below.

TABLE I

| | M | L | G |
|---|---|---|---|
| $\Delta 0$ | $0.68*10^{-2}$ | $0.54*10^{-2}$ | $0.46*10^{-2}$ |
| $\Delta 1$ | $0.98*10^{-3}$ | $0.78*10^{-3}$ | $0.65*10^{-3}$ |
| $\Delta 2$ | $1.06*10^{-6}$ | $0.85*10^{-6}$ | $0.707*10^{-6}$ |

A first embodiment computes the DCT with a controllable precision, that is, the precision of computations can be selected beforehand. It may be maximal or less than maximal. The precision of computation may even be different for different steps of computations.

The accuracy of a representation of relative values of coefficients of a transform given by Equation set (6) is defined by a system of equations (7) which depend on one parameter $\Delta$. Choosing the parameter $\Delta$, one can change the accuracy of coefficient representation. The term "controllable accuracy" is used hereinafter to refer to this concept.

If a precision is maximal, the inaccuracy may be introduced only at the quantization step. This implementation is best suited for two-dimensional signal processing systems. In this case the quantization step does not take place since an introduction of an additional inaccuracy is not acceptable. The preferable approximation in this case is with normal or double precision.

In a second embodiment of the present invention, a transform precision is selected in accordance with a precision of quantization matrix in such a way that the final distortion caused by a transform inaccuracy is less than a quantization inaccuracy. Since a quantization matrix is selected on the basis of visual perception, the transform precision should be selected on the same basis. The preferable approximation of coefficients in this case is with zero or normal precision.

The scheme of the one-dimensional transform

Referring to FIG. 1, the scheme of one-dimensional transform is shown. This scheme implements the system of Equations (4) with an approximation of coefficients in accordance with Equations (6) and (7) without taking into consideration the normalization multipliers of Equations (4).

All preliminary results of computations on the first two steps are represented as two-component values of the form: $a+\sqrt{2}b$, where a is a rational component and b is an algebraic component. The components a and b are transformed separately.

Normalization coefficients which appear after two steps of a transform as results of multiplications of values outside of figure brackets in Equation set (4) can be represented either precisely or approximately as two-component values with a rational and an algebraic part. As a result the procedure of normalization is implemented in one of two ways:

1) using multiplications at the third step, or
2) without multiplications.

The accuracy of such a representation in the second option (i.e. without multiplications) is defined by a matrix of quantization.

It can be selected to satisfy a wide range of quantization matrices.

The value $\sqrt{2}$ and normalization coefficients in the option without multiplication is represented at the last step in the extended binary form, i.e. in the form of sums and differences of negative powers of two.

In accordance with the scheme shown in FIG. 1, a rational and an algebraic component of a non-normalized one-dimensional transform are computed.

The values of brightnesses, luminances, or chrominances (in the case of color pictures) of appropriate columns (or rows) of pixels are the inputs of the scheme. In the following discussion, instead of all three terms, i.e. brightness, luminance, or chrominance, only luminance will be used.

The scheme shown in FIG. 1 has the following notations:

a) solid lines from left to right mean sending an appropriate value from the left node to the right node without a change;
b) dotted lines mean sending a value from the left node to the right node with a change in the sign of the value;
c) nodes with a line (solid or dotted) entering from the left mean summation where the number of terms is equal to the number of lines entering the node;
d) an arrow pointed up means multiplication by 2 of a value generated by a node as a result of summation;
e) an arrow pointed down means multiplication by $\Delta/2$ of a value generated by a node, where $\Delta$ is the same as in Equations (6) and (7); and
f) nodes without entering lines are final nodes where a final result of a one-dimensional transform is generated.

The scheme has a configuration of a "butterfly" where sums and differences of values simultaneously going out from nodes of a previous level of computations are generated.

At the first level of computations, the following values are generated: $f(0)\pm f(7)$, $f(1)\pm f(6)$, $f(2)\pm f(5)$, and $f(3)\pm f(4)$.

In the following the notations $\tilde{F}(0), \ldots, \tilde{F}(7)$ are used for non-normalized values. These values correspond to normalized components $F(0), \ldots, F(7)$ as follows:

$\tilde{F}(0)=2\ F(0)/\alpha$ $\tilde{F}(4)=2\ F(4)/\alpha$ $\tilde{F}(2)=2\ F(2)/\delta$ $\tilde{F}(6)=2\ F(6)/\delta$ $\tilde{F}(1)=2\ F(1)/v$ $\tilde{F}(5)=2\ F(5)/v$ $\tilde{F}(3)=2\ F(3)/v$ $\tilde{F}(7)=2\ F(7)/v$ Values $\tilde{F}(0), \ldots, \tilde{F}(7)$ can be obtained from the transformed components using multiplication by a constant which is greater than one.

The basic principle of the following method is that all transformations need only integer arithmetic operations, that is, no floating point operations are required. To achieve this at the first step (i.e. operations on columns) non-normalized values are computed. Non-normalized values are then transformed at the second step (i.e. operations of rows). In this manner non-normalized components of a two-dimensional transform will be generated. The operation of normalization, which is multiplication by a normalizing multiplier, is accomplished after all operations related to the transform.

Since transformed components should be quantized, i.e. a matrix of transformed components should be pointwise multiplied by a quantization matrix in accordance with Equation set (5), a normalization, i.e. pointwise multiplication of transformed components by a normalizing multiplier, can be combined with quantization.

In the remaining description the method and system of computing non-normalized components is emphasized. The normalization and quantization operations, whether performed individually or in a combined step, are considered to be readily understood by those of ordinary skill in this field.

At the second level of computations in the butterfly configuration, which includes $f(0)+f(7)$, $f(1)+f(6)$, $f(2)+f(5)$, and $f(3)+f(4)$, algebraic parts of components $\tilde{F}(2)$ and $\tilde{F}(6)$ are generated.

Note that two expressions, those for $\tilde{F}(0)$ and $\tilde{F}(4)$, have only a rational part as an intermediate result.

At the third level of computations in the butterfly, which includes $f(0)+f(7)$, $f(1)+f(6)$, $f(2)+f(5)$, and $f(3)+f(4)$, rational parts of components $\tilde{F}(2)$ and $\tilde{F}(6)$ are generated.

At the third level of computations using values $f(3)-f(4)$, $f(2)-f(5)$, $f(1)-f(6)$, and $f(0)-f(7)$ algebraic parts of components $\tilde{F}(1)$, $\tilde{F}(3)$, $\tilde{F}(5)$, and $\tilde{F}(7)$, are generated in the form:

$$A(\tilde{F}(1)) = (2+\Delta/2)[f(2)-f(5)] + (3+\Delta/2)$$
$$[f(1)-f(6)]$$
$$A(\tilde{F}(5)) = (2+\Delta/2)[f(0)-f(7)] + (3+\Delta/2)$$
$$[f(3)-f(4)]$$
$$A(\tilde{F}(3)) = (3+\Delta/2)[f(0)-f(7)] - (2+\Delta/2)$$
$$[f(3)-f(4)]$$
$$A(\tilde{F}(7)) = (3+\Delta/2)[f(2)-f(5)] - (2+\Delta/2)$$
$$[f(1)-f(6)].$$

As a result, for every element of a processed fragment, four values are obtained: a rational and an algebraic part from a transform of a rational part of the first step, and a rational and algebraic part from a transform of an algebraic part of the first step.

A normalization matrix is shown in FIG. 2, and a normalization is done using a multiplication of non-normalized transformed values by an appropriate element of a normalization matrix.

To obtain a final result, transformed values should be quantized in accordance with Eq. 5. Examples of typical quantization matrix for a luminance and a chrominance of a color image are shown in FIG. 3.

The relations shown in Eqs. 6 and 7 can be viewed from a different point of view as definitions of non-normalized transform coefficients. Under these considerations transform components F(0), F(2), F(4) and F(6) will not change. The other transform components can be expressed in the following form:

Equation set (4')
$$F(1) = n_0\{L[f(0)-f(7)] + M[f(2)-f(5)] +$$
$$[f(3)-f(4)] + G[f(1)-f(6)]\}$$
$$F(3) = n_0\{G[f(0)-f(7)] - L[f(2)-f(5)] -$$
$$M[f(3)-f(4)] - [f(1)-f(6)]\}$$
$$F(5) = n_0\{M[f(0)-f(7)] + [f(2)-f(5)] +$$
$$G[f(3)-f(4)] - L[f(1)-f(6)]\}$$
$$F(7) = n_0\{[f(0)-f(7)] + G[f(2)-f(5)] -$$
$$L[f(3)-f(4)] - M[f(1)-f(6)]\}$$

where $n_0 = 1/\sqrt{2(1+L^2+G^2+M^2)}$

In the butterfly, which includes algebraic parts of $\tilde{F}(1)$, $\tilde{F}(3)$, $\tilde{F}(5)$, and $\tilde{F}(7)$, rational parts of $\tilde{F}(1)$, $\tilde{F}(3)$, $\tilde{F}(5)$, and $\tilde{F}(7)$ are generated in the form:
The scheme of the two-dimensional transform The two-dimensional transform scheme can be generated by processing two one-dimensional transforms sequentially. This can be done in several different ways. The simplest way is to transform separately algebraic and rational parts of intermediate results obtained after the first transform. This method is described in the following steps.

The first step results in computing a rational and algebraic part of an intermediate result. As discussed above, the expression for $\tilde{F}(0)$ and $\tilde{F}(4)$ have only a rational part as an intermediate result.

At the second step, a rational and an algebraic part of an intermediate result are transformed separately using the scheme of FIG. 1.

The computational scheme presented in FIG. 1 is a scheme of fast transform for non-normalized values using multiplication by powers of two. It should be noted that in this scheme, operands of addition operations are integers. As a result of this, errors in the process of computation are not accumulated.

and has the following numerical expressions:

$$n_0 = \begin{bmatrix} 0.09805807\ldots & \text{for } \Delta = \Delta_0 \\ 0.09747227\ldots & \text{for } \Delta = \Delta_1 \\ 0.09754508\ldots & \text{for } \Delta = \Delta_2 \end{bmatrix}$$

Therefore, a transform matrix, defined by Eqs. 4 with the modifications given in Eqs. 4' which includes non-normalized coefficients, has the form:

$$Q = \begin{bmatrix} 1 & 1 & 1 & 1 & 1 & 1 & 1 & 1 \\ 1 & -1 & 1 & -1 & 1 & -1 & 1 & -1 \\ B & -1 & -B & 1 & B & -1 & -B & 1 \\ 1 & B & -1 & -B & 1 & B & -1 & -B \\ L & M & -1 & -G & -L & -M & 1 & G \\ M & 1 & -G & L & -M & -1 & G & -L \\ G & -L & M & 1 & -G & L & -M & -1 \\ 1 & G & L & M & -1 & -G & -L & -M \end{bmatrix}$$

The matrix Q has pairwise orthogonal rows for every value of a parameter $\Delta$ which can equal $\Delta 0$, $\Delta 1$, or $\Delta 2$. After an appropriate normalization, columns of matrix Q will become orthogonal.

This can be checked by direct calculation. This matrix, under a given normalization, defines an orthogonal transform with coefficients having a less complicated form than DCT coefficients.

Hereinafter a transform defined by a matrix Q will be called a Discrete Algebraic Transform (DAT).

It is possible to approximate DCT coefficients with normalized DAT coefficients with a required precision by selecting parameter $\Delta$ in accordance with Eq. 7. In this sense DAT is compatible with DCT.

It is well known that DCT is in turn an approximation of an optimal transform from a wide class of images. (See N. Ahmed, T. Natarajan, K. R. Rao, Discrete Cosine Transform. IEEE Transaction on Computers, January, 1974, pp. 90–93). Therefore, it is possible that in some situations combinations of a forward and an inverse transform for DAT will give better results (i.e., a more accurate picture reproduction) than combinations of a forward and an inverse transform for DCT.

It should be noted that a majority of DAT coefficients are equal to DCT coefficients or are good approximations of DCT coefficients. The degree of approximation can be chosen sufficiently high. In this sense DAT is compatible with DCT, i.e. can be used in different combinations with DCT, for example as a combination forward DAT—inverse DCT or vice versa.

Figure 4A:
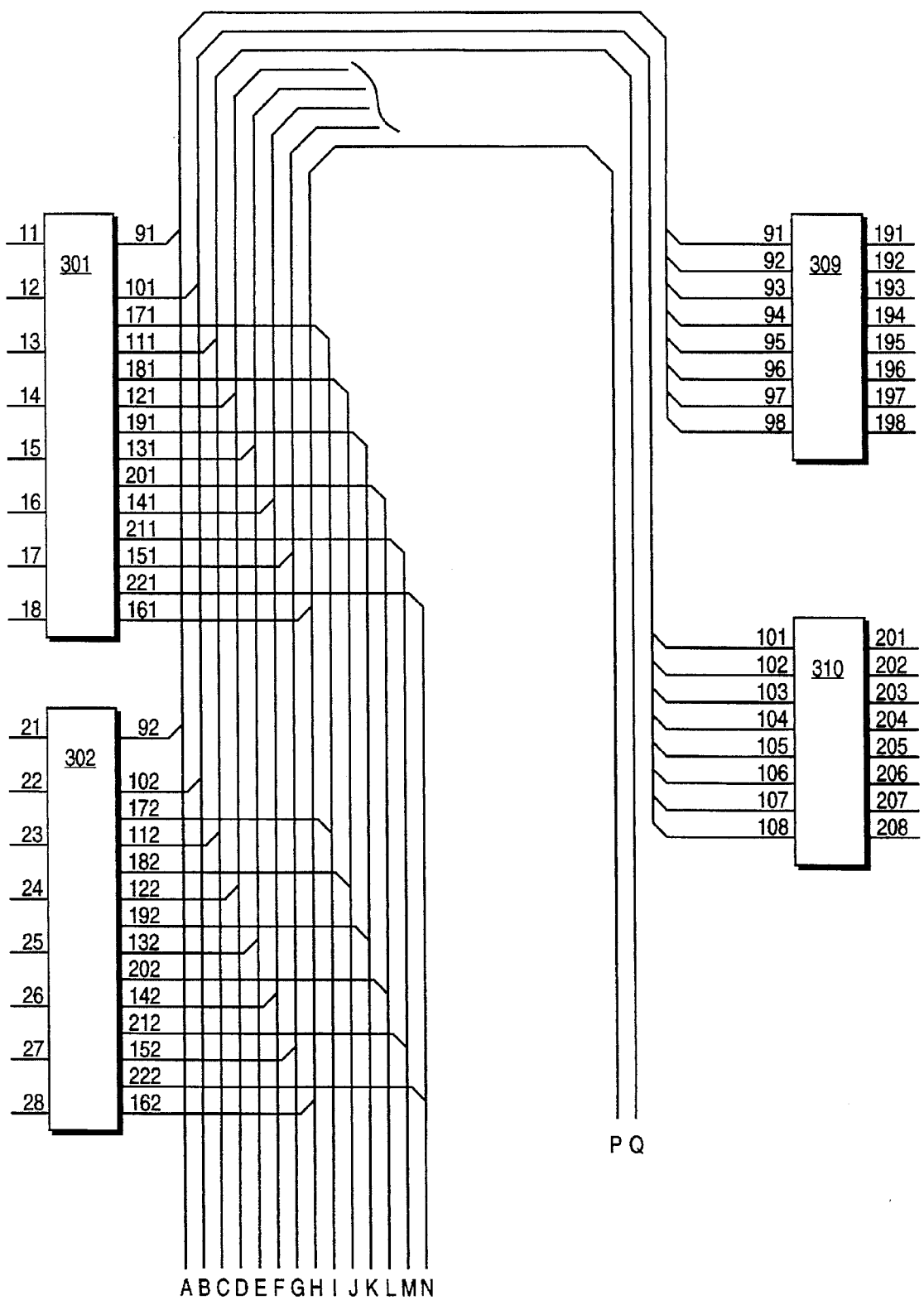
FIG. 4 is a block diagram of a system for the realization of a two-dimensional discrete cosine transform for an 8*8 fragment.
Figure 4B:
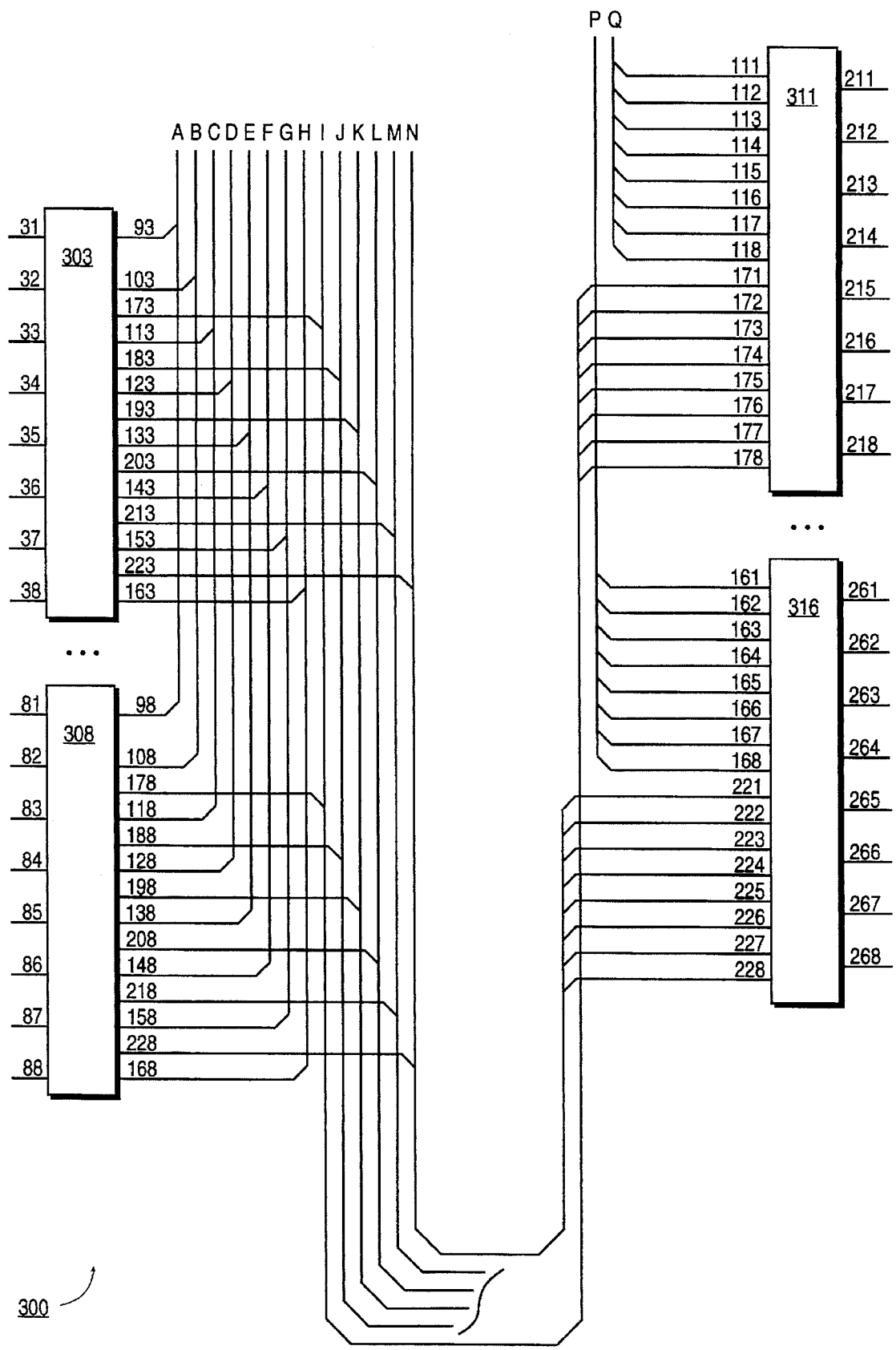

A preferred embodiment of the present invention is a system for the realization of two-dimensional discrete cosine transform with separation of a rational and an algebraic part of intermediate results for 8*8 fragments as shown in FIG. 4.

The system implements the computational principle illustrated in FIG. 1 which shows how for every combination of eight input signals corresponding to a transformed column, eight rational and six algebraic components of auxiliary results are generated. Accordingly, system 300 is shown to include one-dimensional column transform modules 301, 302, 303, 304, 305, 306, 307, and 308; modules of rational one-dimensional row transform and generation of final result 309 and 310; modules of two-component one-dimensional row transform and generation of final result 311, 312, 313, 314, 315, and 316.

One-dimensional column transform modules 301, 302, 303, 304, 305, 306, 307 and 308 have eight inputs correspondingly coupled to buses as shown in FIG. 4 to receive externally generated signals representing luminances. Modules 301, 302, 303, 304, 305, 306, 307 and 308 have a set of fourteen outputs coupled to buses, as shown in FIG. 4, to develop signals representing results of intermediate computations. These results of intermediate computations are combinations of rational and algebraic components. Output buses are arranged in such a way that the eight least significant digits in a group represent rational components and the six most significant digits represent algebraic components.

As follows from FIG. 1, two components of transformed columns do not have algebraic parts, and therefore, modules 309 and 310 process rows which have only rational components.

Rational one-dimensional row transform and generation of final results modules 309 and 310 have a set of eight inputs coupled to buses to receive signals representing intermediate results of computations (i.e. rational components generated at the outputs of modules 301, 302, 303, 304, 305, 306, 307 and 308). Modules 309 and 310 have a set of eight outputs coupled to buses as shown in FIG. 4 to develop signals representing final results.

Since elements of remaining rows have rational as well as algebraic components, for a transform of these rows two modules of one-dimensional transform have been used. The first group of signals represents rational components and the second group of signals represents algebraic components of a result of column transform.

Two-component one dimensional row transform and generation of final result modules 311, 312, 313, 314, 315, and 316 have a set of sixteen inputs coupled to buses as indicated in FIG. 4, to receive two groups of signals. The first group of signals received by each module represents a rational part and the second group of signals represents an algebraic part of a result of a column transform. Modules 311-316 further have a set of eight outputs each for the development of signals representing final results.

The scheme of two-dimensional transform shown in FIG. 4 differs from a standard solution for a system of signal processing. The 0 difference is that in the scheme of the present invention, auxiliary results of the first step are presented in two-component form and every component is transformed separately which allows for computation using only integer arithmetic.

Figure 5:
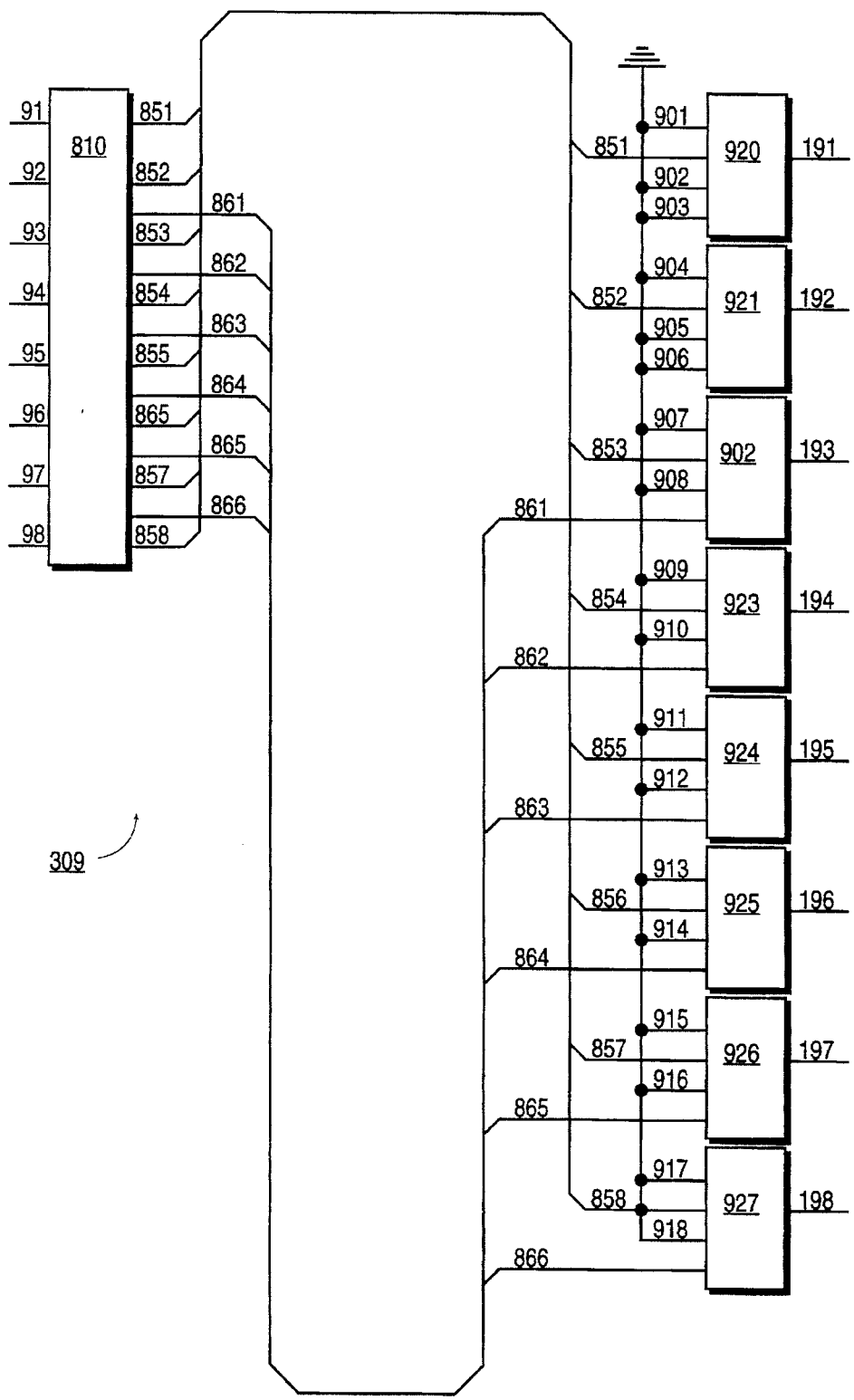
FIG. 5 is a block diagram of a system for the transform of a rational part of intermediate results of computations included in the system shown in FIG. 4.

One-dimensional row transform modules 309 and 310 are identical. The internal details of module 309 are shown in FIG. 5. This module is shown to include one-dimensional transform module 810 and generators of final results 920-927.

One-dimensional transform module 810 has a set of inputs coupled to buses as shown in FIG. 5, to receive signals representing rational parts of intermediate results. Module 810 has a set of outputs coupled to buses 851-858, to develop rational components of the second step of a transform and a set of outputs coupled to buses 861-865 and 866 to develop signal representing algebraic components of the second step of a transformation.

Since rational and algebraic parts of the first step of a transform have been processed separately, four signals are received on the input of a final results generator. These four signals represent a rational and an algebraic part as a result of a transformation of a rational component, and a rational and an algebraic part as a result of a transformation of an algebraic component. As a result of this, final result generators 920-927 have a set of four inputs coupled respectively to buses as shown in FIG. 5.

This configuration is defined by a module shown in FIG. 5, where an algebraic part of an auxiliary result is equal to 0, and an algebraic part of a transformed result has only six components. Final result generators 920-927 have a set of outputs respectively coupled to buses 191-198 upon which the generators develop signals representing final results, i.e. components of two-dimensional DCT.

One-dimensional two-component transform modules 311-316 are identical. These modules transform rational as well as algebraic components.

Figure 6:
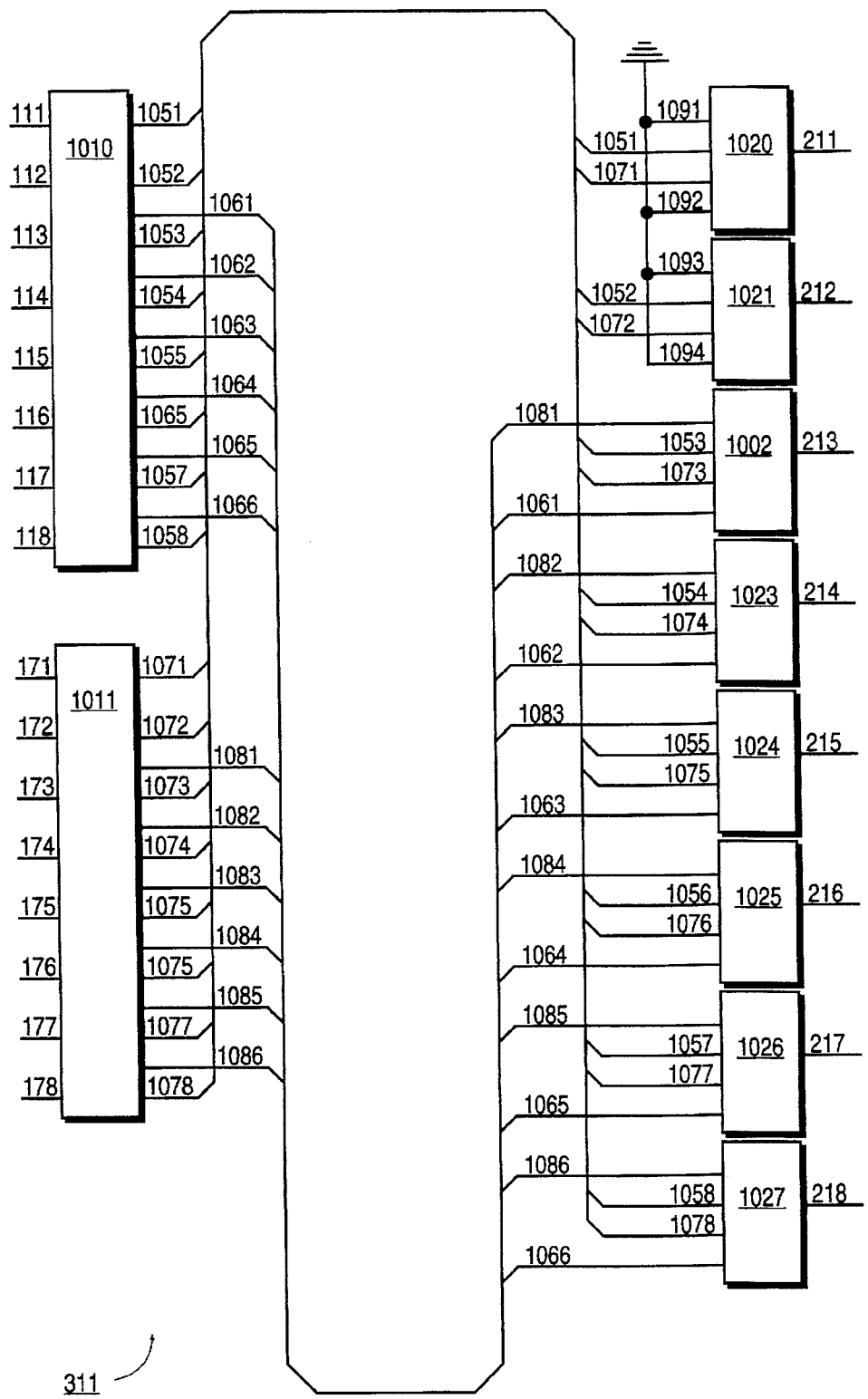
FIG. 6 is a block diagram of a system for the transform of a rational and an algebraic part of intermediate results of computations included in the system shown in FIG. 4.

Referring to FIG. 6, internal details of module 311 are shown. Module 311 is shown to include one dimensional transform modules 1010 and 1011, and final result generators 1020-1027.

One-dimensional transform module 1010 transforms a rational part of an auxiliary result to the first step and has a set of inputs coupled to buses 111-118 to receive signals representing rational parts of intermediate computations. Module 1010 has a set of outputs coupled to buses 1051-1058, to develop signals representing rational components of the second step of a transform and a set of outputs coupled to buses 1061-1066 to develop signals representing algebraic components of the second step of a transform.

One-dimensional transform module 1011 has a set of inputs coupled to buses 171-178 to receive signals representing algebraic parts of intermediate computations. Module 1011 has a set of outputs coupled to buses 1071-1078 to develop signals representing rational components of the second step of a transform and a set of outputs coupled to buses 1081-1086 to develop signals representing algebraic components of the second step of the transform.

Final result generators 1020-1027 have a set of four inputs coupled respectively to buses as shown in FIG. 6. Buses 1091-1094 are grounded since an algebraic part of a transformed result has only six components. Further, final result generators 1020-1027 have a set of outputs coupled to buses, as shown in FIG. 6, upon which the generators develop signals representing final results, i.e. components of two-dimensional DCT.

All one-dimensional transform modules 301-308, shown in FIG. 4, and one dimensional transform units of modules 309-316 of system 300 are identical.

Figure 7:
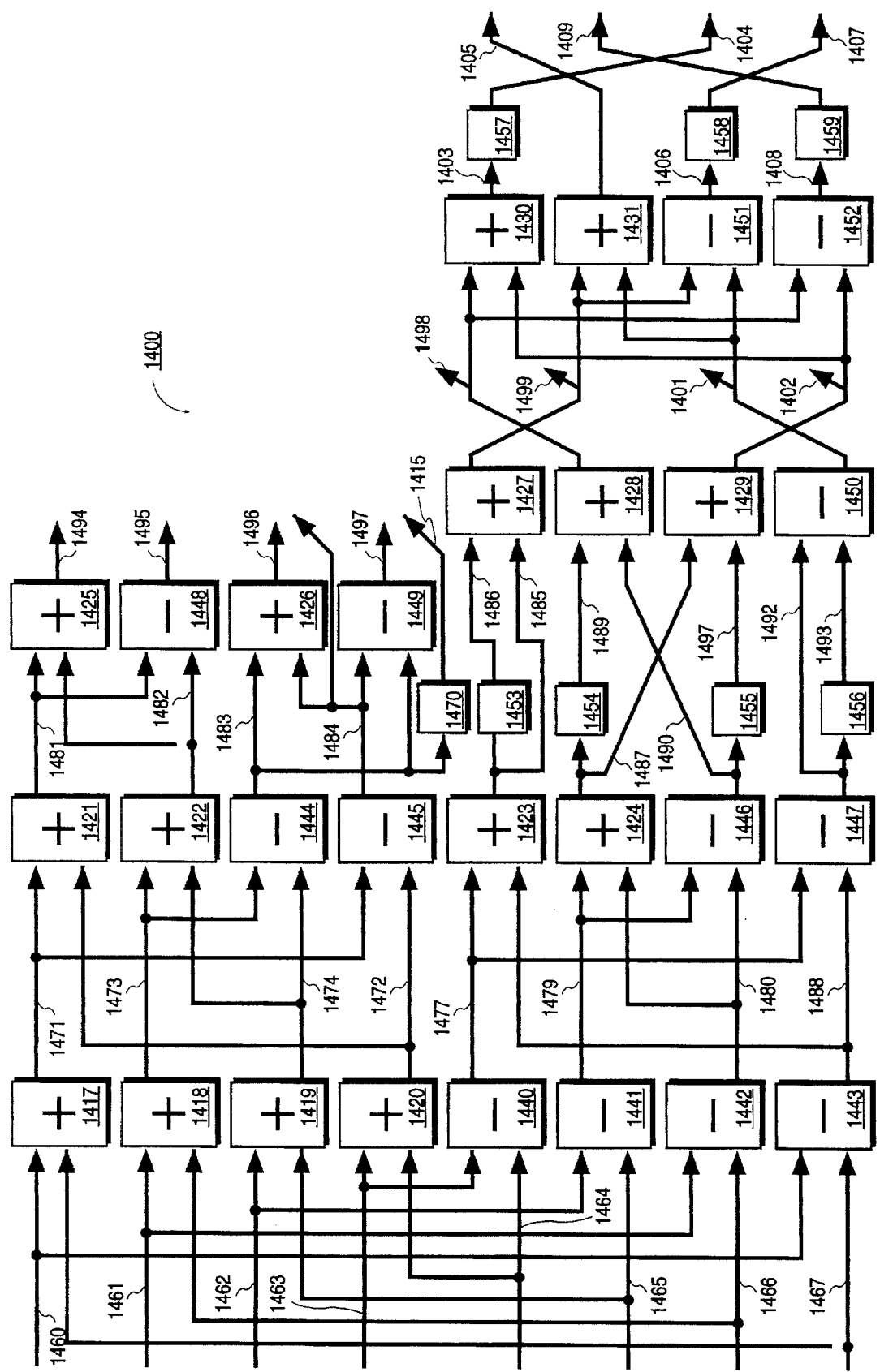
FIG. 7 is a block diagram of a system for the one-dimensional non-normalized DCT transforms which are shown in FIGS. 5 and 6.

Referring to FIG. 7, a one-dimensional transform module is shown. This module implements the computational scheme of FIG. 1 which in turn is a fast implementation of one-dimensional DCT described by Equations set (4).

System 1400 is shown to include adders 1417-1431, subtraction units 1440-1452, precision control units 453-456 and sign inverters units 1457-1459 and 1470.

System 1400 has a set of inputs coupled to buses 1460-1467 to receive externally generated signals representing luminances or intermediate results of computations. System 1400 has a set of outputs coupled to buses 1494-1497, 1404, 1405, 1407 and 1409 upon which the system develops signals representing a rational part of an intermediate result. System 1400 also has a set of outputs coupled to buses 1401, 1402, 1415, 1484, 1498, and 1499 upon which the system develops signals representing an algebraic part of an intermediate result.

Adders 1417-1431 are identical. They have two sets of inputs coupled to a pair of buses to receive externally generated signals representing luminances or intermediate results of computations. Adders 1417-1431 have a set of outputs coupled to an appropriate bus upon which the adder develop signals representing a sum of numbers represented by signals on two input buses.

Adder 1417 has a first set of inputs coupled to a bus 1460, a second set of inputs coupled to a bus 1467 and set of outputs coupled to a bus 1471.

Adder 1418 has a first set of inputs coupled to a bus 1461, a second set of inputs coupled to a bus 1466 and set of outputs coupled to a bus 1473.

Adder 1419 has a first set of inputs coupled to a bus 1462, a second set of inputs coupled to a bus 1465 and set of outputs coupled to a bus 1474.

Adder 1420 has a first set of inputs coupled to a bus 1463, a second set of inputs coupled to a bus 1464 and set of outputs coupled to a bus 1472.

Adder 1421 has a first set of inputs coupled to a bus 1471, a second set of inputs coupled to a bus 1472 and set of outputs coupled to a bus 1481.

Adder 1422 has a first set of inputs coupled to a bus 1473, a second set of inputs coupled to a bus 1474 and set of outputs coupled to a bus 1482.

Adder 1423 has a first set of inputs coupled to a bus 1477, a second set of inputs coupled to a bus 1478 and set of outputs coupled to a bus 1485.

Adder 1424 has a first set of inputs coupled to a bus 1479, a second set of inputs coupled to a bus 1480 and set of outputs coupled to a bus 1487.

Adder 1425 has a first set of inputs coupled to a bus 1481, a second set of inputs coupled to a bus 1482 and set of outputs coupled to a bus 1494.

Adder 1426 has a first set of inputs coupled to a bus 1483, a second set of inputs coupled to a bus 1484 and set of outputs coupled to a bus 1496.

Adder 1427 has a first set of inputs coupled to a bus 1486, a second set of inputs coupled to a bus 1485 and set of outputs coupled to a bus 1499.

Adder 1428 has a first set of inputs coupled to a bus 1489, a second set of inputs coupled to a bus 1490 and set of outputs coupled to a bus 1498.

Adder 1429 has a first set of inputs coupled to a bus 1487, a second set of inputs coupled to a bus 1491 and set of outputs coupled to a bus 1402.

Adder 1430 has a first set of inputs coupled to a bus 1498, a second set of inputs coupled to a bus 1402 and set of outputs coupled to a bus 1403.

Adder 1431 has a first set of inputs coupled to a bus 1499, a second set of inputs coupled to a bus 1401 and set of outputs coupled to a bus 1405.

Subtraction units 1440–1452 are identical. They have two sets of inputs: a "positive" set and a "negative" set, coupled to a pair of buses to receive externally generated signals representing luminances or intermediate results of computations. Subtraction units 1440–1452 have a set of outputs coupled to an appropriate bus upon which the subtraction units develop signals representing a result of subtracting a number represented by signals on a bus coupled to a "negative" set of inputs from a number represented by signals on bus coupled to a "positive" set of inputs.

Subtraction unit 1440 has a set of "positive" inputs coupled to a bus 1463, a set of "negative" inputs coupled to a bus 1464 and a set of outputs coupled to a bus 1477.

Subtraction unit 1441 has a set of "positive" inputs coupled to a bus 1462, a set of "negative" inputs coupled to a bus 1465 and a set of outputs coupled to a bus 1479.

Subtraction unit 1442 has a set of "positive" inputs coupled to a bus 1461, a set of "negative" inputs coupled to a bus 1466 and a set of outputs coupled to a bus 1480.

Subtraction unit 1443 has a set of "positive" inputs coupled to a bus 1460, a set of "negative" inputs coupled to a bus 1467 and a set of outputs coupled to a bus 1478.

Subtraction unit 1444 has a set of "positive" inputs coupled to a bus 1473, a set of "negative" inputs coupled to a bus 1474 and a set of outputs coupled to a bus 1483.

Subtraction unit 1445 has a set of "positive" inputs coupled to a bus 1471, a set of "negative" inputs coupled to a bus 1472 and a set of outputs coupled to a bus 1484.

Subtraction unit 1446 has a set of "positive" inputs coupled to a bus 1479, a set of "negative" inputs coupled to a bus 1480 and a set of outputs coupled to a bus 1490.

Subtraction unit 1447 has a set of "positive" inputs coupled to a bus 1477, a set of "negative" inputs coupled to a bus 1478 and a set of outputs coupled to a bus 1492.

Subtraction unit 1448 has a set of "positive" inputs coupled to a bus 1481, a set of "negative" inputs coupled to a bus 1482 and a set of outputs coupled to a bus 1495

Subtraction unit 1449 has a set of "positive" inputs coupled to a bus 1484, a set of "negative" inputs coupled to a bus 1483 and a set of outputs coupled to a bus 1497.

Subtraction unit 1450 has a set of "positive" inputs coupled to a bus 1492, a set of "negative" inputs coupled to a bus 1493 and a set of outputs coupled to a bus 1401.

Subtraction unit 1451 has a set of "positive" inputs coupled to a bus 1499, a set of "negative" inputs coupled to a bus 1401 and a set of outputs coupled to a bus 1406.

Subtraction unit 1452 has a set of "positive" inputs coupled to a bus 1498, a set of "negative" inputs coupled to a bus 1402 and a set of outputs coupled to a bus 1408.

Precision control units 1453–1456 have a set of inputs coupled to corresponding buses 1485, 1487, 1490 and 1492 to receive externally generated signals, and a set of outputs coupled to corresponding buses 1486, 1489, 1491 and 1493 upon which precision control units develop signals.

Sign inverters (units) 1457–1459 have a set of inputs coupled to corresponding buses 1403, 1406, 1408, and 1483 to receive externally generated signals and a set of outputs connected to corresponding buses 1404, 1407, 1409, and 1415 upon which the sign inverters develop signals representing a result of multiplying a number by −1.

The system shown in FIG. 7 includes precision control modules which control the precision of DCT coefficients approximation. The parameter of an approximation is given in Eq. set (7). The relative accuracy of this approximation is given in Table 1.

Precision control modules 1453–1456 are identical.

Figure 8:
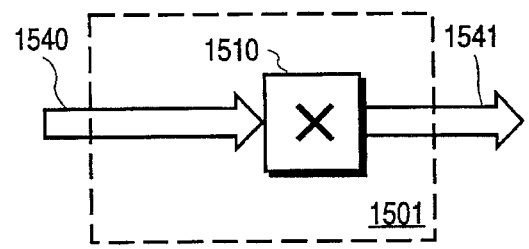
FIG. 8 is a block diagram of a precision control unit included in the system shown in FIG. 7.
Figure 8:
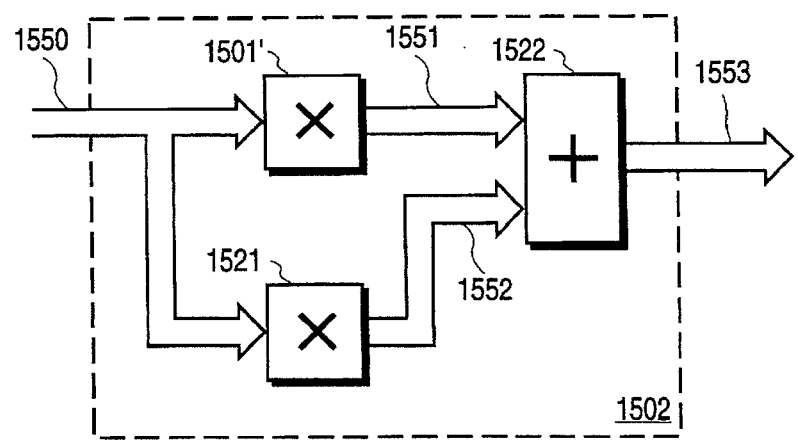
Figure 8:
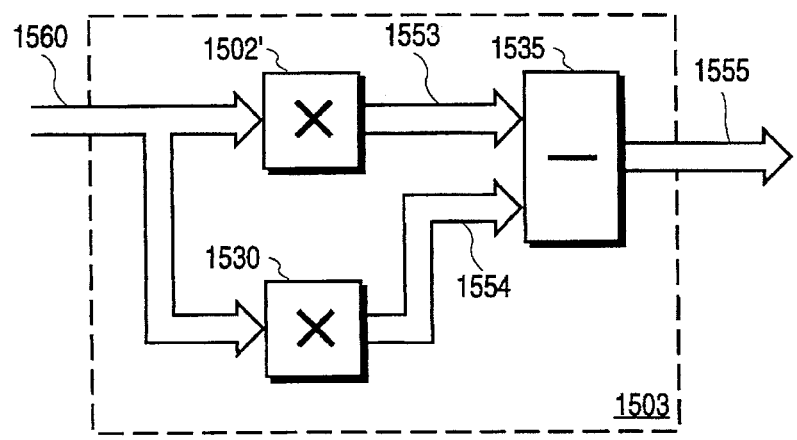

Precision control modules for different precision levels are shown in FIG. 8. They are designated 1501 for zero precision 1502 for normal precision and 1503 for double precision.

Module 1501 is shown to have a set of inputs coupled to a bus 1540 to receive signals representing intermediate results of computation and a set of outputs coupled to a bus 1541 upon which module 1501 develops signals representing input numbers multiplied by 2.

Module 1502 is shown to include a multiply by 2 unit 1501' identical to module 1501, a divide by 64 unit 1521 and an adder 1522.

Unit 1501' has a set of inputs coupled to a bus 1550 to receive signals representing intermediate results of computation and a set of outputs coupled to a bus 1551.

Unit 1521 has a set of inputs coupled to a bus 1550 and a set of outputs coupled to a bus 1552 to develop signals representing an input number divided by 64.

Adder 1522 has a set of inputs coupled to a bus 1551 to receive signals developed by unit 1501' and a set of inputs coupled to a bus 1552 to receive signals developed by unit 1521. Adder 1522 has a set of outputs coupled to a bus 1553 to develop signals representing the sum of its input signals.

Module 1503 is shown to include a module 1502' identical to module 1502, a divide by 512 unit 1520, and a subtraction unit 1535.

Unit 1502' has a set of inputs coupled to a bus 1560 to receive signals representing intermediate results of computation and a set of outputs coupled to a bus 1553.

Unit 1530 has a set of inputs coupled to a bus 1560 and a set of outputs coupled to a bus 1554 to develop signals representing an input number divided by 512.

Subtraction unit 1535 has a set of "positive" inputs coupled to a bus 1553, a set of "negative" inputs coupled to a bus 1554 to receive signals developed by unit 1530. Unit 1535 has a set of outputs coupled to a bus 1555 to develop signals representing the difference of its input signals.

Figure 9:
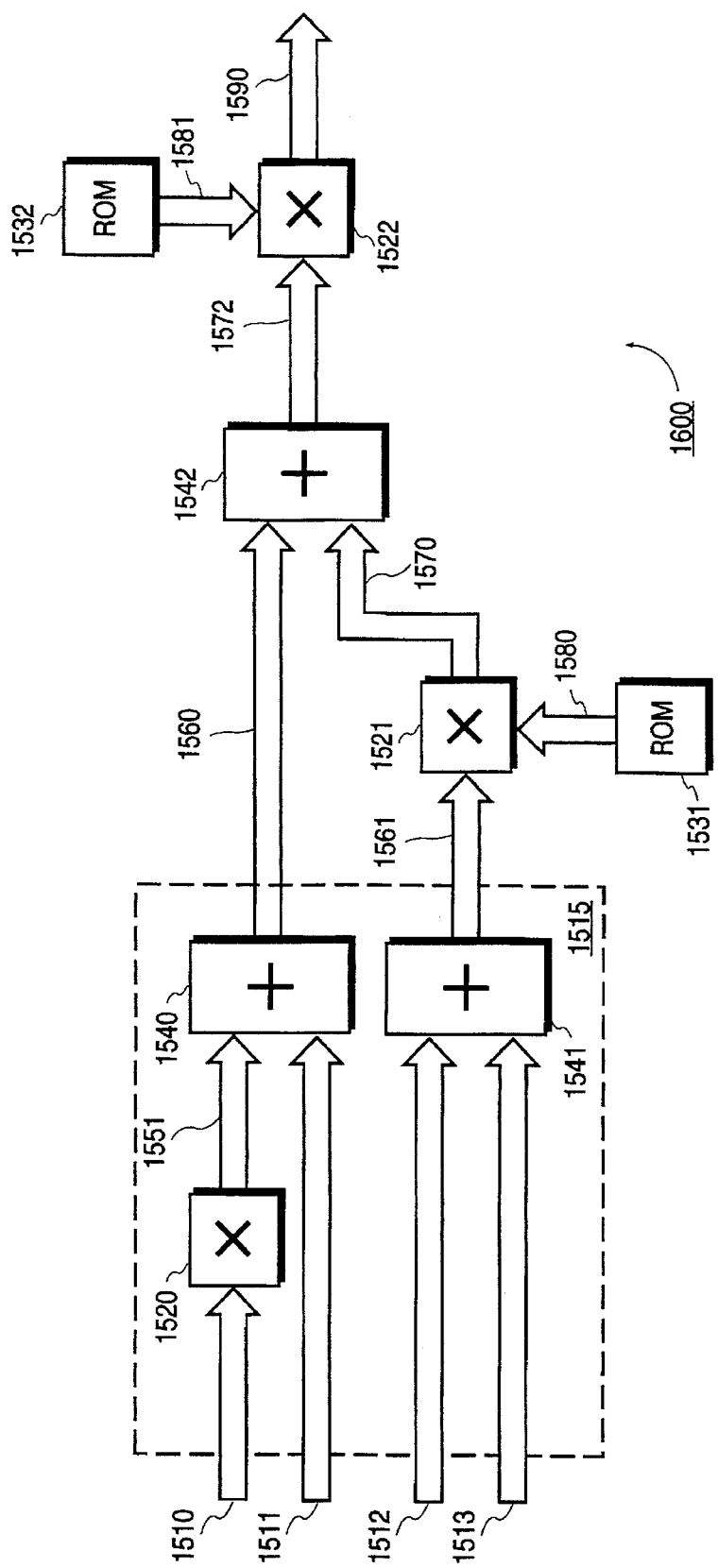
FIG. 9 is a block diagram of a generator of a final result which is included in the system shown in FIG. 4.
Figure 10:
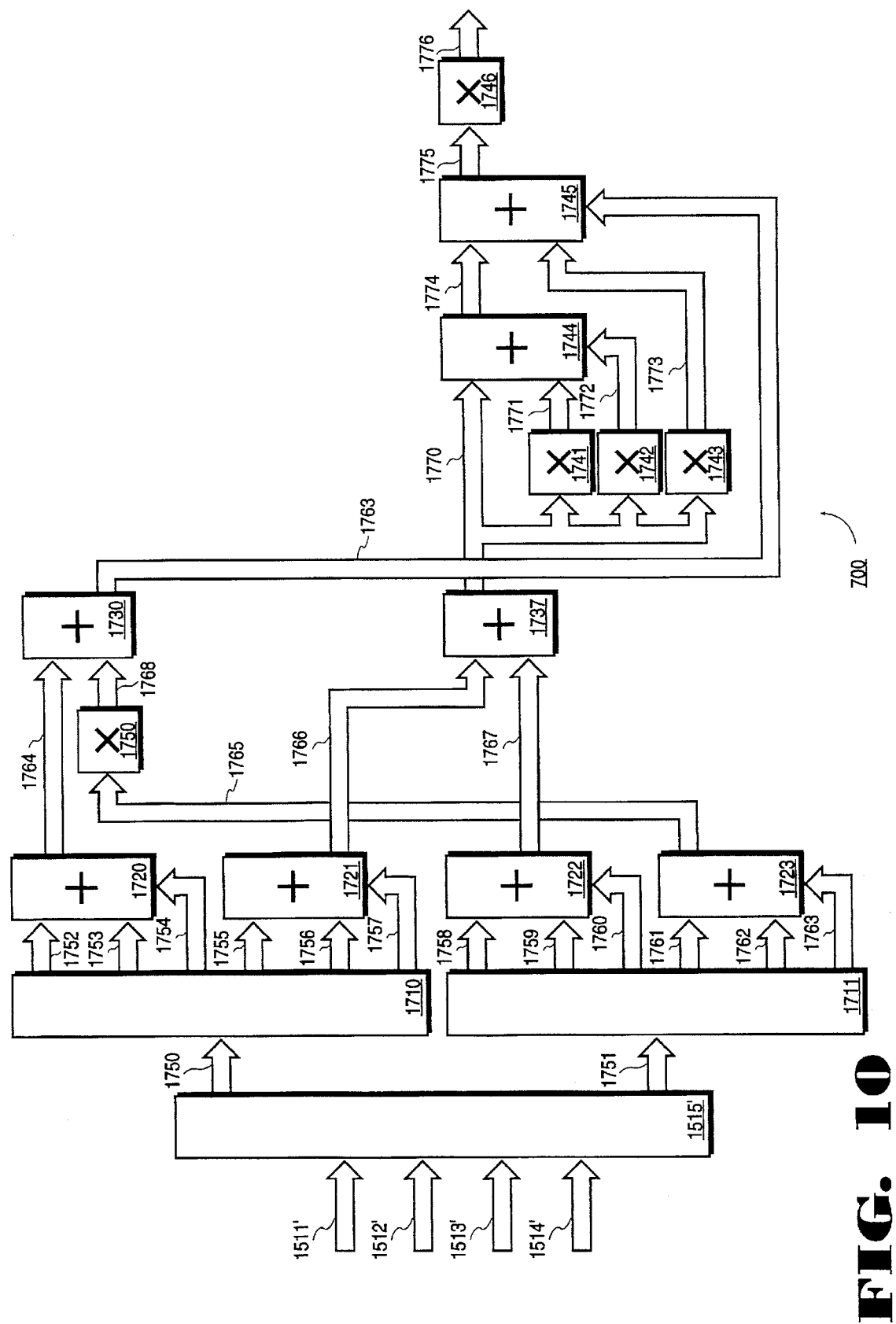
FIG. 10 is a block diagram of a generator of a final result without multiplications which is included in the system shown in FIG. 4.

Generators of final results are shown in FIG.9 and 10 with two options: with a controllable precision and with precision coordinated with a quantization matrix.

As can be seen from FIG. 1, a precision increase of a one-dimensional transform does not have a great impact on the complexity of a scheme of one-dimensional transform. It is easy to find by direct calculations that the number of additions for a zero precision is equal to 28, for a normal precision is equal to 32, and for a double precision is equal to 36. As a result of these additions a rational and an algebraic part of transformed values are obtained.

Note that all multiplications and divisions here and in the following, have as one of the operands a power of two. Therefore all these operations are equivalent to shifts of a binary sequence which represents a corresponding number. Final result generation scheme for DCT components with a controllable precision The complete scheme of generating final results for components requires the following operations:

a) combining non-normalized values which correspond to a pixel and are obtained as a result of the first two transform steps;

b) computing a value of non-normalized components of a transform which corresponds to a pixel by combining the rational and algebraic parts of a non-normalized transformed value; and c) normalizing by means of a matrix of normalization coefficients shown in FIG. 2.

In the first operation, the rational part of a non-normalizing transform value is expressed as a sum of two numbers. The first number R(R) is the rational part of a number generated at the second step of a transform computation as a result of a transform of a rational part of a number generated at the first step of a transform. The second number A(A) is an algebraic part of a number generated at the second step of a transform as a result of a transform of an algebraic part of a number generated at the first step of a transform, multiplied by two.

An algebraic part of a non-normalizing transform value in the first operation is also a sum of two numbers. The first number A(R), is an algebraic part of the number generated at the second step of a transform computation as a result of a transform of a rational part of a number generated at the first step of a transform. The second number R(A), is a rational part of a number generated at the second step of a transform as a result of a transform of an algebraic part of a number generated at the first step of transform.

The second operation is accomplished by multiplication of an algebraic part of a non-normalized transformed value by $\sqrt{2}$ and a summation of this result with a rational part of a non-normalized transformed value.

The third operation is accomplished by multiplication of a non-normalized transformed value by a corresponding element of a normalization matrix N.

Therefore, in this embodiment of the present invention, a result of a transform is generated using two multiplications for a pixel.

Referring to FIG. 9, the configuration for generating final results for DCT components with a controllable precision is shown and is generally designated by reference numeral 1600. System 1600 is shown to include a plurality of input buses 1510, 1511, 1512 and 1513, a subsystem 1515, two multiply-by-a-constant modules 1521 and 1522, two ROM cells 1531 and 1532 which store constants $\sqrt{2}$ and an appropriate element of a normalization matrix N, respectively, and adder 1542. Subsystem 1515 includes multiply by two module 1520, adders 1540 and 1541, and bus 1551. Subsystem 1515 further includes outputs coupled to buses 1560 and 1561.

Multiply-by-two module 1520 has a set of inputs coupled to bus 1510 to receive signals representing results of intermediate computations A(A). Module 1520 has a set of outputs coupled to bus 1551 upon which the module develops signals representing an input number multiplied by two.

As shown in FIG. 9, adder 1540 has two sets of inputs coupled to buses 1511 and 1551 to receive signals R(R) and 2A(A). Adder 1541 has two sets of inputs coupled to buses 1512 and 1513 to receive signals R(A) and A(R). Adder 1542 has two sets of inputs coupled to buses 1560 and 1570 to receive signals representing rational and multiplied by $\sqrt{2}$ algebraic part of non-normalized component. Signals representing R(R), R(A) and A(R) are received on buses 1511, 1512 and 1513 respectively. Adders 1540, 1541, and 1542 have a set of outputs connected to buses 1560, 1561 and 1572 respectively, upon which the adders develop signals representing a sum of two input numbers. Rational and algebraic parts of non-normalized values are developed on buses 1560 and 1561 respectively.

Multiply-by-a-constant modules 1521 and 1522 have two sets of inputs 1561, 1580 and 1572, 1581 respectively. The multipliers receive signals on inputs 1561 and 1572 that represent results of intermediate computations. The multipliers receive signals on inputs 1580 and 1581 that represent constants $\sqrt{2}$ and an appropriate element of a normalization matrix N. Multipliers 1521, 1522 each have a set of outputs coupled respectively to buses 1570 and 1590 upon which to develop signals representing results of an intermediate computation and a final result respectively.

The scheme of generating final results for DCT components with precision coordinated with a quantization matrix This scheme is directed towards computation of intermediate results with zero and normal precision and use of a quantization matrix from a class of JPEG standard matrices for image compression which allow a relatively high compression ratio.

Two examples of such matrices are shown in FIG. 3. This scheme, like a scheme with controllable precision, requires three sequential operations for generating a final result. The first two operations are the same as in a scheme with controllable precision. The important feature of this scheme is the way it accomplishes the third operation, i.e. the operation of normalization and computation of a value $\sqrt{2}$.

The basis of the scheme is in selecting an approximation for normalizing multipliers and a value $\sqrt{2}$ to minimize its impact on a final result (i.e. to make it less than the impact of a quantization step). It is possible to accomplish the whole cycle of generating a final result, before quantization, without multiplication.

To implement this approach it is necessary to find a simple form of approximation for normalization multipliers in two-component algebraic form. This form of approximation should not have an impact on a final result. Additionally, it is necessary to find an approximation for a value $\sqrt{2}$ and normalizing multipliers with coefficients in an extended binary form. Hereinafter extended binary form means a representation of a number as a series of sums and differences of powers of two.

The present invention provides an approximation of normalization multipliers in the form which produces satisfactory precision for a broad class of quantization matrices similar to matrices shown in FIG. 3.

The approximations have the following form:

$$v^2 \cong 1/32(1 - 1/8 - 1/64) \sqrt{2} \qquad \text{Eq. set 8}$$

$$v\sqrt{2} \cong 1/4 [(1 + 1/64) + (\sqrt{2})/16]$$

$$v\delta \cong 1/16 [((1 + 1/64) + (\sqrt{2})/8]$$

$$\delta^2 \cong 1/8 (-1/4 + \sqrt{2})$$

$$\delta\sqrt{2} \cong \delta 1/2 [1 + (\sqrt{2})/16]$$

Therefore, the generalized form of an expression from Eq. set 8 may be written as:

$$N = 2^{-1} [r + \sqrt{2} \ a] \qquad \text{Eq. 9}$$

where r and a have an extended binary form and a number of terms in an expression for every component r and a does not exceed 3, i.e. $r = r_1 + r_2 + r_3$, and $a = a_1 + a_2 + a_3$ where $r_1, r_2, r_3$, $a_1, a_2, a_3$ are positive, negative, or are equal to zero.

Results of approximation are presented in Table 2.

TABLE 2

| normalization multiplier | number of terms | | precision | |
|---|---|---|---|---|
| | rational part | algebraic part | % | bits |
| $v^2$ | 0 | 3 | 0.21 | 8.9 |
| $v\sqrt{2}$ | 2 | 1 | 0.037 | 11.4 |
| $v\delta$ | 2 | 1 | 0.18 | 9.1 |
| $\delta^2$ | 1 | 1 | 0.63 | 7.3 |
| $\delta\sqrt{2}$ | 1 | 1 | 0.55 | 7.5 |
| ⅛ | 1 | 0 | 0.00 | — |

Precision in bits in Table 2 is equal to a binary logarithm of a relative precision of an approximation taken with a negative sign.

Although the precision of approximation for different normalization multipliers is not the same, this is compensated for because the coefficients with the lowest precision occur in a normalization matrix less frequently than coefficients with higher precision.

To obtain a final result of composition of a rational and an algebraic part a value √2 is expressed in an extended binary form as:

$$\sqrt{2} = 1 + 1/2 - 1/16 - 1/64 \qquad \text{Eq. 10}$$

The relative precision of this expression is equal to 0.54% and precision in bits is equal to 7.5.

The scheme with a precision coordinated with a quantization matrix has an important difference in comparison to a scheme with controllable precision. The former proceeds with normalization in algebraic form and then combines a rational and algebraic part with an approximation of a value √2 in a final result.

Normalization in an algebraic form is accomplished according to the formula:

$$(R + \sqrt{2} \ A) 2^{-1} (r + \sqrt{2} \ a) =$$

$$2^{-1} [Rr + 2Aa + \sqrt{2} \ (Ra + Ar)]$$

where $R + \sqrt{2} \ A$ is a non-normalized value where R+√2 A is a non-normalized value of a transformed component, and "1" is a constant.

Therefore, to obtain a rational part of a normalized transformed component, expressed in algebraic form, it is necessary to add the doubled product of an algebraic part of a non-normalized transformed component and an algebraic part of a normalization multiplier to a product of the rational part of a non-normalized transformed component and a rational part of the normalization multiplier.

An algebraic part of a normalized transformed component, expressed in algebraic form, is obtained as the sum of a product of a rational part of non-normalized transformed component and an algebraic part of the normalization multiplier and a product of an algebraic part of the non-normalized transformed component and a rational part of a normalization multiplier.

Composition of a rational and an algebraic part of a normalized transformed component is accomplished in accordance with Eq. 10. This is done by adding an algebraic part of the normalized transformed component to a rational part of the same component. To this result, an algebraic part of a normalized transformed component divided by two, is added. Next, an algebraic part of the component divided by sixteen is subtracted from the previous result. Finally, from this result, an algebraic part of a component divided by sixty-four is subtracted and this result is multiplied by $2^{-1}$.

The system which implements the above described method is shown in FIG. 10 and is generally designated by reference numeral 1700. System 1700 is shown to include module 515' which is identical to module 515 of system 600 (shown in FIG.9), multiplication modules 1710 and 1711; two-stage adders 1720, 1721, 1722, 1724, 1744, and 1745; multiplication by two module 1750; two adders 1730 and 1731; and multipliers for a fixed power of two 1741, 1742, 1743, and 1760. Module 1515' has a set of inputs coupled to buses 1511', 1512', 1513' and 1514', and further includes a set of outputs coupled to buses 1750 and 1751.

Multiplication modules 1710 and 1711 have a set of inputs coupled to buses 1750 and 1751 respectively, to correspondingly receive signals representing rational and algebraic parts of non-normalized components. In accordance with a representation of normalizing multipliers corresponding to Eq. (9), modules 1710 has at most six sets of outputs coupled to buses 1752, 1753, 1754, 1755 1756 and 1757. Module 1711 has at most six sets of outputs coupled to buses 1758, 1759, 1760, 1761, 1762 and 1763. This architecture is used to develop signals representing results of multiplication of an input number by an appropriate power of two.

Two-stage adders 1720, 1721, 1722, 1723, 1744, and 1745 have three sets of inputs coupled to buses 1752, 1753 and 1754; 1755, 1756 and 1757; 1758, 1759 and 1760; 1761, 1762 and 1763; 1770, 1771, and 1772; and 1774, 1772, and 1769, respectively, to receive signals representing results of intermediate computations. Two-stage adders 1720, 1721, 1722, 1723, 1744, and 1745 have a set of outputs coupled to buses 1760, 1764, 1766, 1767, 1765, 1774, and 1775, respectively, upon which to develop signals representing results of summations of three input numbers.

Multiplication by two module 1750 has a set of inputs coupled to bus 1765 to receive signals representing results of intermediate computations and a set of outputs coupled to bus 1768 to develop signals representing an input number multiplied by two.

Adders 1730 and 1731 have two sets of inputs coupled to buses 1764 and 1768; and 1766 and 1767 respectively to receive signals representing results of intermediate computations. Adders 1730 and 1731 have a set of inputs coupled to buses 1769 and 1770 respectively to develop signals representing the sum of the input numbers.

Modules 1741, 1742, 1743, and 1746 have a set of inputs coupled to buses 1770 and 1775 to receive signals representing intermediate results and a set of outputs coupled to buses 1771, 1772, 1773 and 1776 respectively to develop signals representing an input number multiplied by a predetermined power of two.

Implementations of a module for multiplication by a power of two are well known to those of ordinary skill in the art and thus are not presented here.

Figure 11:
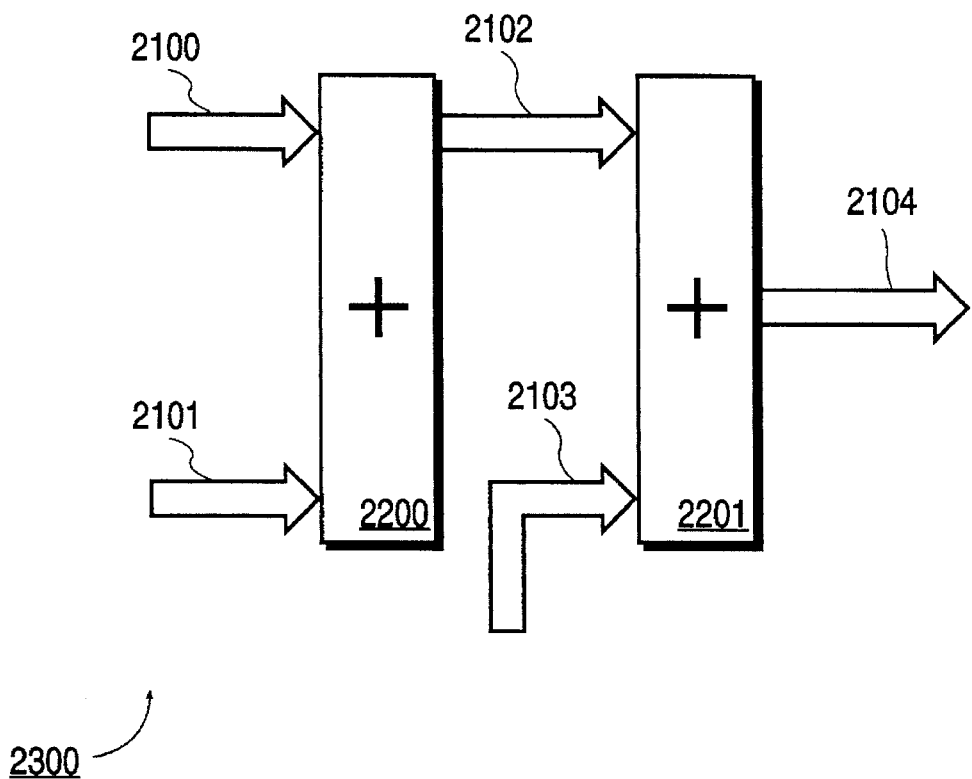
FIG. 11 is a block diagram of a two-step adder which is included in the system shown in FIG. 10.

Two-stage adders 1720, 1721, 1722, 1723, 1744, and 1745 are identical. A two-stage adder is shown in FIG. 11 and is designated by reference numeral 2300. Two adders 2200 and 2201 are shown to be included in two-stage adder 2300.

Adders 2200 and 2201 have two sets of inputs coupled to buses 2100 and 2101; and 2102 and 2103 respectively to receive signal representing results of intermediate computations. Adders 2200 and 2201 have a set of outputs coupled to buses 2102 and 2104 respectively upon which the adders develop signals representing a sum of three input numbers.

Although the present invention has been described in terms of the preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A computer implemented method for compressing an image using a discrete algebraic transform (DAT) using a first circuit, said image being represented by one or more 8*8 picture fragments and stored in a memory coupled to said first circuit, said memory storing the results of said DAT, each of said one or more 8*8 picture fragments having a property of separability, said first circuit for producing non-normalized components, said method comprising the computer implemented steps of:

said first circuit generating a one-dimensional transform for producing non-normalized components given in the form:

$$\begin{bmatrix} \tilde{F}(0) \\ \tilde{F}(4) \\ \tilde{F}(2) \\ \tilde{F}(6) \\ \tilde{F}(1) \\ \tilde{F}(5) \\ \tilde{F}(3) \\ \tilde{F}(7) \end{bmatrix} = \begin{bmatrix} 1 & 1 & 1 & 1 & 1 & 1 & 1 & 1 \\ 1 & -1 & 1 & -1 & 1 & -1 & 1 & -1 \\ B & -1 & -B & 1 & B & -1 & -B & 1 \\ 1 & B & -1 & -B & 1 & B & -1 & -B \\ L & M & -1 & -G & L & -M & 1 & G \\ M & 1 & -G & L & -M & -1 & G & -L \\ G & -L & M & 1 & -G & L & -M & -1 \\ 1 & G & L & M & -1 & -G & -L & -M \end{bmatrix} \times \begin{bmatrix} f(0) \\ f(2) \\ f(4) \\ f(6) \\ f(7) \\ f(5) \\ f(3) \\ f(1) \end{bmatrix}$$

where f(.) are the input values of a transform corresponding to one of said 8*8 picture fragment, $\tilde{F}(.)$ are transformed non-normalized values, $B=1+\sqrt{2}$, $L=5+\Delta$, $G=(3+\Delta/2)\sqrt{2}$, $M=(2+\Delta/2)\sqrt{2}$, and $\Delta$ is a parameter, selection of which, allows an approximation of a transform matrix of DCT by a transform matrix of DAT.

2. The method of claim 1, wherein:

a forward and an inverse DAT may be used in any combination with a forward and an inverse DCT.

3. A computer implemented method of image compression, transforming an 8×8 block of image pixel signals into corresponding frequency signals, said computer including a memory and being coupled to a processor, said method comprising the steps of:

said computer using pixel signals representing columns of said 8×8 block of image pixel signals and approximate representations of discrete cosine transform (DCT) matrix terms to generate first intermediate results, said DCT matrix terms being represented in a form a+ $\sqrt{2}$b, where a represents a rational part and b represents an algebraic part, said first intermediate results, being represented in said form, including a first rational part and a first algebraic part;

said computer using said first intermediate results to generate second intermediate results, said second intermediate results including a second rational part, a third rational part, a second algebraic part and a third algebraic part, said second rational part being generated from a transform of said first algebraic part, said second algebraic part being generated from a transform of said first rational part, said third rational part being generated from a transform of said first rational part, said third algebraic part being generated from a transform of said first algebraic part;

said computer combining, using addition, said second rational part with said second algebraic part to generate first signals corresponding to an algebraic part of said frequency signals;

said computer combining, using addition, said third rational part with twice said third algebraic part to generate second signals corresponding to a rational part of said frequency signals: and said computer storing said algebraic part and said rational part of said frequency signals in said memory.

4. The method of claim 3 wherein said first signals and said second signals represent non-normalized frequency components of said 8×8 block of image pixel signals.

5. The method of claim 4 further comprising the steps of: normalizing said non-normalized frequency components of said 8×8 block of image pixel signals.

6. The method of claim 3 wherein said first intermediate results are generated using the following DCT matrix term approximations:

$$\frac{\cos\frac{\pi}{8}}{\sin\frac{\pi}{8}} = 1 + \sqrt{2}$$

$$\frac{\cos\frac{\pi}{16}}{\sin\frac{\pi}{16}} = 5 + \Delta$$

$$\frac{\cos\frac{3\pi}{16}}{\sin\frac{\pi}{16}} = \left(3 + \frac{\Delta}{2}\right)\sqrt{2}$$

$$\frac{\sin\frac{3\pi}{16}}{\sin\frac{\pi}{16}} = \left(2 + \frac{\Delta}{2}\right)\sqrt{2}$$

where $\Delta$ defines a level of precision.

7. The method of claim 6 wherein $\Delta$ is one of zero and 1/32 and 1/32–1/256.

8. In a computer system comprising a processor and a memory, a computer implemented method of compressing digitized image data, transforming image pixel signals into corresponding frequency signals, said method comprising the computer implemented steps of:

said processor segmenting said image pixel signals into n×n blocks of image pixel signals, where n is a multiple of 8;

for each n×n block, said processor performing the following steps:

accessing said block of image pixel signals from said memory, generating frequency signals having a rational part and an algebraic part; and said processor storing said frequency signals in said memory.

9. The method of claim 8, wherein said step of generating frequency signals further comprises the steps of:

said processor applying approximate representations of discrete cosine transform (DCT) matrix terms to said pixel signals representing columns of said n×n block of image pixel signals to generate first intermediate results, said DCT matrix terms being represented in a separable form having a rational part and an algebraic part, a+√2b, where a represents said rational part and b represents said algebraic part, said first intermediate results, being represented in said separable form, including a first rational part and a first algebraic part;

said processor generating second intermediate results using said first intermediate results, said second intermediate results including a second rational part, a third rational part, a second algebraic part and a third algebraic part, said second rational part being generated from a transform of said first algebraic part, said second algebraic part being generated from a transform of said first rational part, said third rational part being generated from a transform of said first rational part, said third algebraic part being generated from a transform of said first algebraic part;

said processor adding said second rational part with said second algebraic part to generate first signals corresponding to the algebraic part of said frequency signals; and said processor adding said third rational part with twice said third algebraic part to generate second signals corresponding to the rational part of said frequency signals.

10. The method of claim 9 wherein said first results are generated using the following approximate representations of DCT matrix terms in said separable form, a+√2b:

$$\frac{\cos\frac{\pi}{8}}{\sin\frac{\pi}{8}} = 1 + \sqrt{2}$$

$$\frac{\cos\frac{\pi}{16}}{\sin\frac{\pi}{16}} = 5 + \Delta$$

$$\frac{\cos\frac{3\pi}{16}}{\sin\frac{\pi}{16}} = \left(3 + \frac{\Delta}{2}\right)\sqrt{2}$$

$$\frac{\sin\frac{3\pi}{16}}{\sin\frac{\pi}{16}} = \left(2 + \frac{\Delta}{2}\right)\sqrt{2}$$

where $\Delta$ defines a level of precision.

11. The method of claim 10 wherein $\Delta$ is one of zero and 1/32 and 1/32–1/256.

12. In a computer system comprising a processor and a memory, a computer implemented method of compressing digitized image data representing a digitized image to generate compressed digitized image data, said method comprising the computer implemented steps of:

said processor segmenting said digitized image data into n×n blocks, where n is a multiple of 8;

for each of said n×n blocks, said processor generating frequency components using approximate representations of DCT matrix terms represented in an algebraic form having a rational part and an algebraic part;

said processor normalizing said frequency components; and said processor quantizing said normalized frequency components using said quantization matrix;

said processor further compressing said quantized normalized frequency components to generate said compressed digitized image data;

said processor storing said compressed digitized image data in said memory.

13. The method of claim 12, wherein said frequency components can be computed with three precision levels using the following approximate representations of DCT matrix terms:

$(\cos\pi/8)/(\sin\pi/8) = 1 + \sqrt{2}$ $(\cos\pi/16)/(\sin\pi/16) = 5 + \Delta$ $(\cos3\pi/16)/(\sin\pi/16) = (3 + \Delta/2)\sqrt{2}$ $(\cos3\pi/16)/(\sin\pi/16) = (2 + \Delta/2)\sqrt{2}$ where $\Delta$ defines a level of precision from said predetermined set of transform accuracy values, {0, 1/32, 1/32–1/256}.

14. A computer implemented method of image compression implementing fast two-dimensional discrete cosine transform (DCT) for 8×8 picture fragments producing, without multiplication, transformed non-normalized components as an intermediate step to generating compressed image data representing a compressed image, said method comprising the computer implemented steps of:

accessing the columns and rows of each of said 8×8 picture fragments; applying approximate representations of DCT matrix terms on the columns (rows) to generate first intermediate results representing one-dimensional DCT values of non-normalized components, wherein each approximate representation of DCT matrix terms is represented by an algebraic form having a rational part and an algebraic part and each of said first intermediate results are in said algebraic form;

performing a one-dimensional transform on the rows (columns) separately for the rational and the algebraic part of each of said first intermediate results to produce second intermediate results in said algebraic form;

combining pairs of rational and algebraic parts of said second intermediate results in a predetermined manner to produce said transformed non-normalized components having said algebraic form;

normalizing said transformed non-normalized components to produce normalized transform values;

quantizing said normalized transform values to produce quantized values;

completing the compression of said quantized values to generate said compressed image data.

15. The method of claim 14, wherein:

said algebraic form is $a+\sqrt{2}b$, where a represents said rational part and b represents said algebraic part;

each of said second intermediate results include a first rational part, a second rational part, a first algebraic part, and a second algebraic part, said first rational part and said first algebraic part obtained as a result of transforming the algebraic parts of one of said first intermediate results, said second rational part and said second algebraic part obtained as a result of transforming the rational part of one of said first intermediate results;

said step of combining includes, for each of said second intermediate results, the steps of:

adding said first rational part and said second algebraic part to obtain said algebraic part of one of said transformed non-normalized components, and adding said second rational part and twice said first algebraic part to obtain said rational part of one of said transformed non-normalized components.

16. The method of claim 15, wherein said transformed non-normalized components can be computed with three precision levels using the following representation of DCT matrix terms:

$$(\cos\pi/8)/(\sin\pi/8) = 1 + \sqrt{2}$$

$$(\cos\pi/16)/(\sin\pi/16) = 5 + \Delta$$

$$(\cos 3\pi/16)/(\sin\pi/16) = (3 + \Delta/2)\sqrt{2}$$

$$(\cos 3\pi/16)/(\sin\pi/16) = (2 + \Delta/2)\sqrt{2}$$

where $\Delta$ defines three selectable levels of precision and has values: 0 for zero precision, 1/32 for normal precision, and 1/32–1/256 for double precision.

17. A computer implemented method of image compression implementing fast two-dimensional discrete cosine transform (DCT) for n×n picture fragments, where n is a multiple of 8, producing, without multiplication, transformed non-normalized components as an intermediate step to generating compressed image data representing a compressed image, said method comprising the computer implemented steps of:

accessing the columns and rows of each of said n×n picture fragments;

applying approximate representations of DCT matrix terms on the columns (rows) to generate first intermediate results representing one-dimensional DCT values of non-normalized components, wherein each approximate representation of DCT matrix terms is represented by an algebraic form having a rational part and an algebraic part and each of said first intermediate results are in said algebraic form;

performing a one-dimensional transform on the rows (columns) separately for the rational and the algebraic part of each of said first intermediate results to produce second intermediate results in said algebraic form;

combining pairs of rational and algebraic parts of said second intermediate results in a predetermined manner to produce said transformed non-normalized components having said algebraic form;

normalizing said transformed non-normalized components to produce normalized transform values;

quantizing said normalized transform values to produce quantized values;

completing the compression of said quantized values to generate said compressed image data.

18. The method of claim 17, wherein:

said algebraic form is $a+\sqrt{2}b$, where a represents said rational part and b represents said algebraic part;

each of said second intermediate results include a first rational part, a second rational part, a first algebraic part, and a second algebraic part, said first rational part and said first algebraic part obtained as a result of transforming the algebraic parts of one of said first intermediate results, said second rational part and said second algebraic part obtained as a result of transforming the rational part of one of said first intermediate results;

said step of combining includes, for each of said second intermediate results, the steps of: adding said first rational part and said second algebraic part to obtain said algebraic part of one of said transformed non-normalized components, and adding said second rational part and twice said first algebraic part to obtain said rational part of one of said transformed non-normalized components.

19. The method of claim 18, wherein said transformed non-normalized components can be computed with three precision levels using the following representation of DCT matrix terms:

$$(\cos\pi/8)/(\sin\pi/8) = 1 + \sqrt{2}$$

$$(\cos\pi/16)/(\sin\pi/16) = 5 + \Delta$$

$$(\cos 3\pi/16)/(\sin\pi/16) = (3 + \Delta/2)\sqrt{2}$$

$$(\cos 3\pi/16)/(\sin\pi/16) = (2 + \Delta/2)\sqrt{2}$$

where $\Delta$ defines three selectable levels of precision and has values: 0 for zero precision, 1/32 for normal precision, and 1/32–1/256 for double precision.

* * * * *